US010173472B2

(12) United States Patent
Kameda et al.

(10) Patent No.: US 10,173,472 B2
(45) Date of Patent: *Jan. 8, 2019

(54) PNEUMATIC TIRE

(71) Applicant: The Yokohama Rubber Co., LTD., Minato-ku, Tokyo (JP)

(72) Inventors: Norifumi Kameda, Hiratsuka (JP); Isamu Kishizoe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 122 days.

This patent is subject to a terminal disclaimer.

(21) Appl. No.: 15/257,689

(22) Filed: Sep. 6, 2016

(65) Prior Publication Data
US 2016/0368325 A1 Dec. 22, 2016

Related U.S. Application Data

(62) Division of application No. 13/618,394, filed on Sep. 14, 2012, now Pat. No. 9,463,670.

(30) Foreign Application Priority Data

Oct. 4, 2011 (JP) .................................. 2011-220477
Oct. 4, 2011 (JP) .................................. 2011-220479

(51) Int. Cl.
*B60C 11/03* (2006.01)
*B60C 11/12* (2006.01)
(Continued)

(52) U.S. Cl.
CPC ........ *B60C 11/0041* (2013.01); *B60C 11/005* (2013.01); *B60C 11/0008* (2013.01);
(Continued)

(58) Field of Classification Search
CPC ..... B60C 11/03; B60C 11/12; B60C 11/0304; B60C 11/0306; B60C 11/0309;
(Continued)

(56) References Cited

U.S. PATENT DOCUMENTS 9,463,670 B2 * 10/2016 Kameda .................. B60C 11/12
2007/0125469 A1 6/2007 Poling et al.
2010/0224297 A1 * 9/2010 Kiwaki .................. B60C 11/11
152/209.23

FOREIGN PATENT DOCUMENTS

CN 1990276 7/2007
EP 1529659 * 5/2005
(Continued)

OTHER PUBLICATIONS

EP 1529659, May 2005, English language machine translation from European Patent Office [http://www.epo.org].*
(Continued)

*Primary Examiner* — Eric Hug
(74) *Attorney, Agent, or Firm* — Thorpe North & Western

(57) ABSTRACT

A pneumatic tire including a plurality of circumferential main grooves extending in a tire circumferential direction and a plurality of land portions partitioned and formed by these circumferential main grooves in a tread portion. Additionally, the plurality of land portions have a plurality of sipes, respectively. Moreover, not less than 90% of the sipes disposed in an inner side region are constituted by two-dimensional sipes and not less than 90% of the sipes disposed in an outer side region are constituted by three-dimensional sipes. Furthermore, the tread portion has a cap rubber and an under rubber. A rubber hardness $H1_{in}$ at $-10°$ C. and a rubber hardness $H2_{in}$ at $20°$ C. of the cap rubber $151_{in}$ in the inner side region, and a rubber hardness $H1_{out}$ at $-10°$ C. and a rubber hardness $H2_{out}$ at $20°$ C. of the cap rubber $151_{out}$ in the outer side region have relationships such that $H1_{in} < H1_{out}$ and $H2_{in} < H2_{out}$.

9 Claims, 10 Drawing Sheets

(51) Int. Cl.
*B60C 11/11* (2006.01)
*B60C 11/00* (2006.01)
*B60C 19/00* (2006.01)

(52) U.S. Cl.
CPC ............ *B60C 11/033* (2013.01); *B60C 11/12* (2013.01); *B60C 11/1218* (2013.01); *B60C 11/0304* (2013.01); *B60C 11/0306* (2013.01); *B60C 19/001* (2013.01); *B60C 2011/0016* (2013.01); *B60C 2011/0025* (2013.01); *B60C 2011/0334* (2013.01); *B60C 2011/0341* (2013.01); *B60C 2011/0374* (2013.01); *B60C 2011/129* (2013.01); *B60C 2011/1227* (2013.01); *B60C 2011/1254* (2013.01)

(58) Field of Classification Search
CPC ......... B60C 11/0311; B60C 2011/1209; B60C 2011/1213; B60C 11/1218; B60C 11/1222; B60C 2011/1227; B60C 11/1236; B60C 2011/0025; B60C 11/0058; B60C 11/11; B60C 11/008; B60C 2011/0016; B60C 11/005; B60C 11/0334; B60C 2011/1254; B60C 11/033; B60C 11/0332; B60C 2011/129; B60C 2011/1295

USPC ......... 152/209.1, 209.2, 209.3, 209.8, 209.9, 152/209.12, 209.13, 209.16, 209.18, 152/209.25, 902

See application file for complete search history.

(56) References Cited

FOREIGN PATENT DOCUMENTS

| EP | 1 630 004 | | 3/2006 |
|----|-----------|---|--------|
| EP | 1630004   | * | 3/2006 |
| EP | 1795372   | * | 6/2007 |

OTHER PUBLICATIONS

EP 1630004, Mar. 2006, English language machine translation from European Patent Office [http://www.epo.org].*
EP 1795372, Jun. 2007, English language machine translation from European Patent Office [http://www.epo.org].*

* cited by examiner

|  | Conventional Example 1 | Conventional Example 2 | Comparative Example 1 | Comparative Example 2 | Comparative Example 3 | Working Example 1 | Working Example 2 |
|---|---|---|---|---|---|---|---|
| Tread pattern | FIG. 2 | FIG. 2 | FIG. 2 | FIG. 2 | FIG. 2 | FIG. 2 | FIG. 2 |
| Number of circumferential main grooves | 3 | 3 | 3 | 3 | 3 | 3 | 3 |
| Form of inner side region land portion sipes | Two-dimensional | Two-dimensional | Two-dimensional | Two-dimensional | Three-dimensional | Two-dimensional | Two-dimensional |
| Form of outer side region land portion sipes | Two-dimensional | Two-dimensional | Three-dimensional | Three-dimensional | Three-dimensional | Three-dimensional | Three-dimensional |
| Inner side region land portion cap rubber hardness | Small | Large | — | Large | Small | Small | Small |
| Outer side region land portion cap rubber hardness | Large | Small | — | Small | Large | Large | Large |
| H1_in/H2_in | 72/68 | 74/70 | 74/70 | 74/70 | 72/68 | 70/66 | 72/68 |
| H1_out/H2_out | 74/70 | 72/68 | 74/70 | 72/68 | 74/70 | 74/70 | 74/70 |
| D_in/D_out | 1.2 | 0.8 | 1 | 1 | 1 | 1.5 | 1.5 |
| S_in/S_out | 1 | 1 | 1 | 1 | 1 | 1.5 | 1.5 |
| S_t | 0.4 | 0.4 | 0.4 | 0.4 | 0.4 | 0.35 | 0.35 |
| Dry steering stability | 97 | 90 | 100 | 95 | 100 | 110 | 110 |
| Snow steering stability | 105 | 95 | 100 | 100 | 95 | 115 | 110 |

FIG. 8a

| | Conventional Example 2 | Comparative Example 1 | Comparative Example 2 | Comparative Example 3 | Working Example 1 | Working Example 2 | Working Example 3 | Working Example 4 |
|---|---|---|---|---|---|---|---|---|
| Tread pattern | FIG. 2 | FIG. 2 | FIG. 2 | FIG. 2 | FIG. 2 | FIG. 2 | FIG. 2 | FIG. 2 |
| Number of circumferential main grooves | 3 | 3 | 3 | 3 | 3 | 3 | 3 | 3 |
| Form of inner side region land portion sipes | Two-dimensional | Two-dimensional | Two-dimensional | Three-dimensional | Two-dimensional | Two-dimensional | Two-dimensional | Two-dimensional |
| Form of outer side region land portion sipes | Two-dimensional | Three-dimensional | Three-dimensional | Three-dimensional | Three-dimensional | Three-dimensional | Three-dimensional | Three-dimensional |
| Inner side region land portion cap rubber hardness | Large | - | Large | Small | Small | Small | Small | Small |
| Outer side region land portion cap rubber hardness | Small | - | Small | Large | Large | Large | Large | Large |
| $H1\_in/H2\_in$ | 74/70 | 74/70 | 74/70 | 72/68 | 70/66 | 72/68 | 68/62 | 70/66 |
| $H1\_out/H2\_out$ | 72/68 | 74/70 | 72/68 | 74/70 | 74/70 | 74/70 | 76/72 | 74/70 |
| $D\_in/D\_out$ | 0.8 | 1 | 1 | 1 | 1.5 | 1.5 | 1.5 | 1.2 |
| $S\_in/S\_out$ | 1 | 1 | 1 | 1 | 1.5 | 1.5 | 1.5 | 1.5 |
| $S, t$ | 0.4 | 0.4 | 0.4 | 0.4 | 0.35 | 0.35 | 0.35 | 0.35 |
| Dry steering stability | 90 | 100 | 95 | 100 | 110 | 110 | 107 | 108 |
| Snow steering stability | 95 | 100 | 100 | 95 | 115 | 110 | 112 | 113 |

FIG. 8b

| | Working Example 5 | Working Example 6 | Working Example 7 | Working Example 8 | Working Example 9 | Working Example 10 | Working Example 11 |
|---|---|---|---|---|---|---|---|
| Tread pattern | FIG. 2 | FIG. 2 | FIG. 2 | FIG. 2 | FIG. 2 | FIG. 5 | FIG. 6 |
| Number of circumferential main grooves | 3 | 3 | 3 | 3 | 3 | 4 | 3 |
| Form of inner side region land portion sipes | Two-dimensional | Two-dimensional | Two-dimensional | Two-dimensional | Two-dimensional | Two-dimensional | Two-dimensional |
| Form of outer side region land portion sipes | Three-dimensional | Three-dimensional | Three-dimensional | Three-dimensional | Three-dimensional | Three-dimensional | Three-dimensional |
| Inner side region land portion cap rubber hardness | Small | Small | Small | Small | Small | Small | Small |
| Outer side region land portion cap rubber hardness | Large | Large | Large | Large | Large | Large | Large |
| H1_in/H2_in | 70/66 | 70/66 | 70/66 | 70/66 | 70/66 | 70/66 | 70/66 |
| H1_out/H2_out | 74/70 | 74/70 | 74/70 | 74/70 | 74/70 | 74/70 | 74/70 |
| D_in/D_out | 2 | 1.5 | 1.5 | 1.5 | 1.5 | 1.5 | 1.5 |
| S_in/S_out | 1.5 | 1.2 | 2 | 1.5 | 1.5 | 1.5 | 1.5 |
| S_t | 0.35 | 0.35 | 0.35 | 0.25 | 0.38 | 0.38 | 0.35 |
| Dry steering stability | 115 | 107 | 115 | 120 | 107 | 107 | 120 |
| Snow steering stability | 120 | 112 | 120 | 105 | 118 | 118 | 125 |

FIG. 8c

| | | | | | | | | | | | |
|---|---|---|---|---|---|---|---|---|---|---|---|
| Form of inner side region land portion sipes | Two-dimensional | Three-dimensional | Three-dimensional | Three-dimensional | Three-dimensional | Three-dimensional | Three-dimensional | Three-dimensional | Three-dimensional | Three-dimensional | Three-dimensional |
| Form of outer side region land portion sipes | Two-dimensional | Two-dimensional | Two-dimensional | Two-dimensional | Two-dimensional | Two-dimensional | Two-dimensional | Two-dimensional | Two-dimensional | Two-dimensional | Two-dimensional |
| Inner side region land portion cap rubber hardness | Large | - | Large | Large | Large | Large | Large | Large | Large | Large | Large |
| Outer side region land portion cap rubber hardness | Small | - | Small | Small | Small | Small | Small | Small | Small | Small | Small |
| H1_in*/H2_in* | 74/70 | 74/70 | 78/75 | 74/70 | 78/75 | 78/75 | 78/75 | 78/75 | 78/75 | 78/75 | 78/75 |
| H1_out*/H2_out* | 72/68 | 74/70 | 70/66 | 72/68 | 70/66 | 70/66 | 70/66 | 70/66 | 70/66 | 70/66 | 70/66 |
| D_out*/D_in* | 1.23 | 1.5 | 1.5 | 1.5 | 1 | 2.5 | 1.5 | 1.5 | 1.5 | 1.5 | 1.5 |
| S_out*/S_in* | 1 | 1.5 | 1.5 | 1.5 | 1 | 2.5 | 1.5 | 1.5 | 1.5 | 1.5 | 1.5 |
| S_t | 0.4 | 0.35 | 0.35 | 0.35 | 0.35 | 0.35 | 0.35 | 0.35 | 0.35 | 0.35 | 0.35 |
| W2*/W1* | 8.07.0 | 8.07.0 | 8.07.0 | 8.07.0 | 8.07.0 | 8.07.0 | 8.08.0 | 8.07.0 | 8.06.0 | 8.07.0 | 8.07.0 |
| W2*-W1* | 1 | 1 | 1 | 1 | 1 | 1 | 0 | 1 | 2 | 1 | 1 |
| Hd2*/Hd1* | 8.57.5 | 8.57.5 | 8.57.5 | 8.57.5 | 8.57.5 | 8.57.5 | 8.58.5 | 8.58.5 | 8.56.5 | 8.57.5 | 8.57.5 |
| Hd2*-Hd1* | 1 | 1 | 1 | 1 | 1 | 1 | 0 | 0 | 3 | 1 | 1 |
| Dry steering stability | 100 | 102 | 110 | 110 | 110 | 107 | 109 | 110 | 110 | 113 | 110 |
| Snow steering stability | 100 | 98 | 108 | 110 | 106 | 108 | 108 | 107 | 108 | 110 | 113 |
| High-speed durability performance | 100 | 100 | 108 | 107 | 107 | 103 | 105 | 106 | 108 | 110 | 110 |

FIG. 9

PNEUMATIC TIRE

RELATED APPLICATIONS

This application is a divisional application of U.S. patent application Ser. No. 13/618,394, filed Sep. 14, 2012, which claims priority to Japan Patent Application No. 2011-220479, filed Oct. 4, 2011, and which also claims priority to Japan Patent Application No. 2011-220477, filed Oct. 4, 2011, all of which are incorporated herein by reference.

BACKGROUND

Technical Field

The present technology relates to a pneumatic tire, and particularly relates to a pneumatic tire by which both dry steering stability and snow steering stability can be achieved.

Related Art

In a typical winter tire, a tread portion has sipes in order to enhance snow steering stability of the tire. The technology described in Japanese Unexamined Patent Application Publication No. 2010-6108A is known as a conventional pneumatic tire that is configured in this manner. In conventional pneumatic tires, compared to the tread portion on a vehicle mounting outer side, the tread portion on a vehicle mounting inner side is formed from a softer rubber and also has a lower sipe density.

With winter tires, there is a demand for enhancement in not only snow steering stability, but also dry steering stability.

SUMMARY

The present technology provides a pneumatic tire whereby both dry steering stability and snow steering stability can be achieved. A pneumatic tire of the present technology includes a plurality of circumferential main grooves extending in a tire circumferential direction, and a plurality of land portions that are partitioned and formed by the circumferential main grooves in a tread portion. In such a pneumatic tire, a region corresponding to 35% of a tread pattern developed width from a first tread edge is an inner side region and a region corresponding to 35% of a tread pattern developed width from a second tread edge is an outer side region. The plurality of land portions each have a plurality of sipes, and not less than 90% of the sipes disposed in the inner side region are constituted by two-dimensional sipes and not less than 90% of the sipes disposed in the outer side region are constituted by three-dimensional sipes. The tread portion comprises a cap rubber and an under rubber, and a rubber hardness $H1_{in}$ at $-10°$ C. and a rubber hardness $H2_{in}$ at $20°$ C. of the cap rubber in the inner side region, and a rubber hardness $H1_{out}$ at $-10°$ C. and a rubber hardness $H2_{out}$ at $20°$ C. of the cap rubber in the outer side region have relationships such that $H1_{in} < H1_{out}$ and $H2_{in} < H2_{out}$.

Additionally, a pneumatic tire according to the present technology includes a plurality of circumferential main grooves extending in a tire circumferential direction, and a plurality of land portions that are partitioned and formed by the circumferential main grooves in a tread portion. In such a pneumatic tire, a region corresponding to 35% of a tread pattern developed width from a first tread edge is an inner side region and a region corresponding to 35% of a tread pattern developed width from a second tread edge is an outer side region. The plurality of land portions each have a plurality of sipes, and not less than 90% of the sipes disposed in the inner side region are constituted by three-dimensional sipes and not less than 90% of the sipes disposed in the outer side region are constituted by two-dimensional sipes. The tread portion comprises a cap rubber and an under rubber, and a rubber hardness $H1_{in}{}^*$ at $-10°$ C. and a rubber hardness $H2_{in}{}^*$ at $20°$ C. of the cap rubber in the inner side region, and a rubber hardness $H1_{out}{}^*$ at $-10°$ C. and a rubber hardness $H2_{out}{}^*$ at $20°$ C. of the cap rubber in the outer side region have relationships such that $H1_{in}{}^* > H1_{out}{}^*$ and $H_{in}{}^* > H2_{out}{}^*$.

With the pneumatic tire according to the present technology, two-dimensional sipes are disposed in the inner side region, and three-dimensional sipes are disposed in the outer side region. Therefore, rigidity in the inner side region is set to be low and rigidity in the outer side region is set to be high. Additionally, the rubber hardnesses $H1_{in}$ and $H2_{in}$ in the inner side region and the rubber hardnesses $H1_{out}$ and $H2_{out}$ in the outer side region have relationships such that $H1_{in} < H1_{out}$ and $H2_{in} < H2_{out}$. Therefore, the rigidity in the inner side region is set to be low and the rigidity in the outer side region is set to be high. Thus, synergistic lowering of the rigidity in the inner side region occurs and synergistic increasing of the rigidity in the outer side region occurs. As a result, when the pneumatic tire is mounted on a vehicle such that the inner side region is on an inner side in a vehicle width direction, the inner side region will contribute greatly to enhancing snow steering stability and the outer side region will contribute greatly to enhancing dry steering stability. Such a configuration is advantageous because both dry steering stability and snow steering stability of the tire are achieved at high levels.

Additionally, with the pneumatic tire according to the present technology, three-dimensional sipes are disposed in the inner side region, and two-dimensional sipes are disposed in the outer side region. Therefore, rigidity in the inner side region is set to be high and rigidity in the outer side region is set to be low. Moreover, the rubber hardnesses $H1_{in}{}^*$ and $H2_{in}{}^*$ in the inner side region and the rubber hardnesses $H1_{out}{}^*$ and $H2_{out}{}^*$ in the outer side region have relationships such that $H1_{in}{}^* > H1_{out}{}^*$ and $H2_{in}{}^* > H2_{out}{}^*$. Therefore, the rigidity in the inner side region is set to be high and the rigidity in the outer side region is set to be low. Thus, synergistic increasing of the rigidity in the inner side region occurs and synergistic lowering of the rigidity in the outer side region occurs. As a result, when a pneumatic tire 1B is mounted on a vehicle such that the inner side region is on an inner side in a vehicle width direction, the inner side region will contribute greatly to enhancing dry steering stability and the outer side region will contribute greatly to enhancing snow steering stability. Such a configuration is advantageous because both dry steering stability and snow steering stability of the tire are achieved at high levels.

BRIEF DESCRIPTION OF THE DRAWINGS

FIGS. 8a-8c include a table showing the results of performance testing of pneumatic tires according to Embodiment 1 of the present technology.

FIG. 9 is a table showing the results of performance testing of pneumatic tires according to Embodiment 2 of the present technology.

DETAILED DESCRIPTION

The present technology is explained in detail below with reference to the drawings. However, the present technology is not limited to these embodiments. Moreover, constituents of the embodiment which can possibly or obviously be substituted while maintaining consistency with the present technology are included. Furthermore, a plurality of modified examples that are described in the embodiment can be freely combined within a scope of obviousness for a person skilled in the art.

Pneumatic Tires of Embodiment 1

Figure 1:
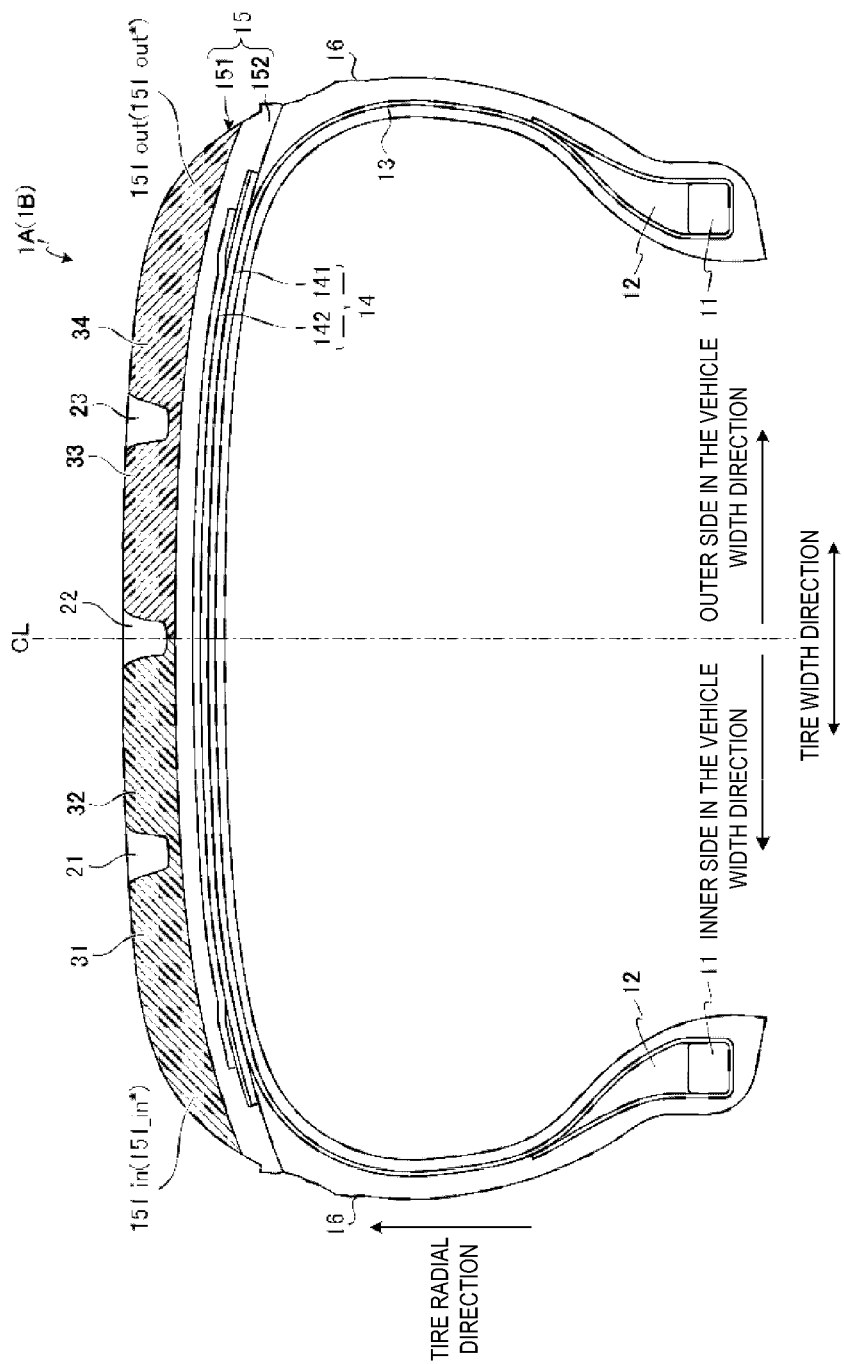
FIG. 1 is a cross-sectional view in a tire meridian direction illustrating a pneumatic tire according to Embodiment 1 (Embodiment 2) of the present technology.
Figure 2:
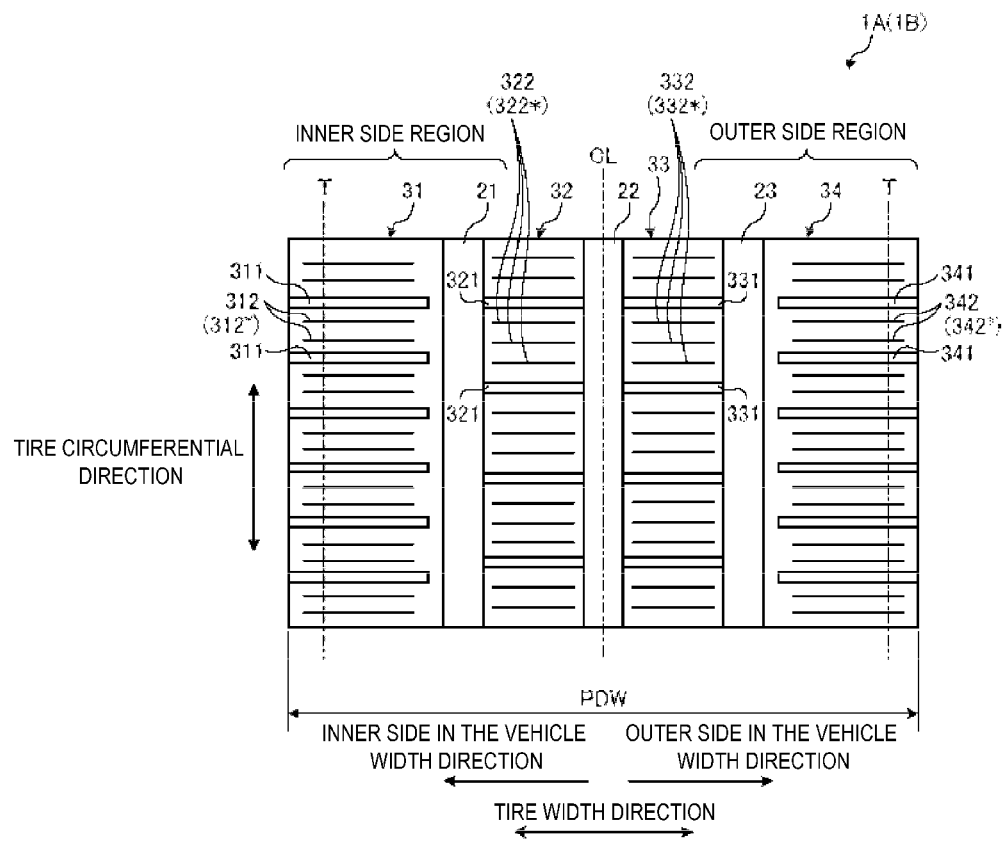
FIG. 2 is a plan view illustrating a tread surface of the pneumatic tire depicted in FIG. 1.

FIG. 1 is a cross-sectional view in a tire meridian direction illustrating a pneumatic tire according to an embodiment of the present technology. FIG. 2 is a plan view illustrating a tread surface of the pneumatic tire depicted in FIG. 1. These drawings depict a radial tire for use on a passenger car. Note that cap tread rubber is depicted in FIG. 1 using hatching.

A pneumatic tire 1A includes a pair of bead cores 11,11, a pair of bead fillers 12,12, a carcass layer 13, a belt layer 14, tread rubber 15, and a pair of side wall rubbers 16,16 (see FIG. 1). The pair of bead cores 11,11 has annular structures and constitute cores of left and right bead portions. The pair of bead fillers 12,12 is disposed on a periphery of each of the pair of bead cores 11,11 in the tire radial direction so as to reinforce the bead portions. The carcass layer 13 has a single-layer structure, and stretches between the left and right bead cores 11 and 11 in toroidal form, forming a framework for the tire. Additionally, both ends of the carcass layer 13 are folded toward an outer side in the tire width direction so as to envelop the bead cores 11 and the bead fillers 12, and fixed. The belt layer 14 is formed from a pair of belt plies 141 and 142 that are laminated, and is disposed in the tire radial direction on a periphery of the carcass layer 13. These belt plies 141 and 142 are formed by arranging and roll processing a plurality of belt cords made from steel or organic fiber material. A crossply structure is achieved by arranging the belt cords so as to incline in mutually different directions with respect to a tire circumferential direction. The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in the tire width direction, so as to form left and right side wall portions of the tire.

Additionally, the pneumatic tire 1A includes a plurality of circumferential main grooves 21 to 23 extending in the tire circumferential direction; and a plurality of land portions 31 to 34 partitioned and formed by the circumferential main grooves 21 to 23 in the tread portion (see FIG. 2). Note that "circumferential main grooves" refers to circumferential grooves having a groove width of 3 mm or greater. Additionally, the land portions 31 to 34 may be rows of blocks (see FIG. 2) or may be ribs (not illustrated).

A region corresponding to 35% of a tread pattern developed width PDW from a first tread edge is an "inner side region". A region corresponding to 35% of a tread pattern developed width PDW from a second tread edge is an "outer side region". Note that differences in the configurations of the inner side region and the outer side region are described later. The tread pattern developed width PDW is the linear distance in a developed drawing between the two edges of the tread-patterned portion of the tire mounted on a standard rim to which a standard inner pressure is applied and no load is applied.

Additionally, the pneumatic tire 1A has an indicator designating a mounting direction (not illustrated) on a vehicle wherein the inner side region is on an inner side in a vehicle width direction. The indicator of the mounting direction of the tire can be displayed by marks or recesses and protrusions provided on the side wall portion of the tire.

For example, with the configuration of FIG. 2, the pneumatic tire 1A has a left-right symmetric tread pattern. The pneumatic tire 1A also has three of the circumferential main grooves 21 to 23. Additionally, the middle circumferential main groove 22 is disposed on a tire equatorial plane CL. Moreover, two center land portions 32 and 33 and a pair of left and right shoulder land portions 31 and 34 are partitioned by these circumferential main grooves 21 to 23. Here, the three circumferential main grooves 21 to 23 and the four land portions 31 to 34 are called, in order from an inner side in the vehicle width direction toward an outer side in the vehicle width direction, a first land portion 31, a first circumferential main groove 21, a second land portion 32, a second circumferential main groove 22, a third land portion 33, a third circumferential main groove 23, and a fourth land portion 34.

Additionally, each of the land portions 31 to 34 has a plurality of lug grooves 311 to 341, respectively, extending in the tire width direction. These lug grooves 311 to 341 are disposed at a predetermined pitch in the tire circumferential direction. Moreover, lug grooves 321 of the second land portion 32 and lug grooves 331 of the third land portion 33 each have an open structure, and cross the second land portion 32 and the third land portion 33 in the tire width direction so as to open to each of the left and right edges thereof. As a result, the second land portion 32 and the third land portion 33 are divided in the tire circumferential direction and a row of blocks is formed. On the other hand, lug grooves 311 of the first land portion 31 and lug grooves 341 of the fourth land portion 34 have a semi-closed structure, and have an end portion that is open at the edge on the outer side in the tire width direction and an end portion that terminates within the land portions on the inner side in the tire width direction. Thus, the first land portion 31 and the fourth land portion 34 form a rib that is continuous in the tire circumferential direction.

Sipe Configuration and Rubber Hardness

With the pneumatic tire 1A, each of the land portions 31 to 34 has a plurality of sipes 312 to 342, respectively (see FIG. 2). Moreover, not less than 90% of the sipes 312 and 322 disposed in the inner side region are constituted by two-dimensional sipes and not less than 90% of the sipes 332 and 342 disposed in the outer side region are constituted by three-dimensional sipes.

Here, "sipes" refers to cuts formed in a land portion. "Two-dimensional sipes" refers to sipes that have a sipe wall face with a linear form (when viewed as a cross-section from a direction perpendicular to a sipe length direction). "Three-dimensional sipes" refers to sipes that have a sipe wall face with a form bending in a sipe width direction (when viewed as a cross-section from a direction perpendicular to the sipe length direction). Compared to the two-dimensional sipes, the three-dimensional sipes have a greater mating force between opposing sipe wall faces and, therefore, act to reinforce rigidity of the land portions.

For example, with the configuration of FIG. 2, the first land portion 31, the second land portion 32, the third land portion 33, and the fourth land portion 34 each have the plurality of sipes 312 to 342. Additionally, the sipes 312 to 342 have a straight form extending in the tire width direction, and are each disposed parallelly in the tire circumferential direction and at a predetermined pitch. Moreover, the sipes 312 to 342 have a closed structure, each terminating within the land portions 31 to 34. Furthermore, the sipes 312 of the first land portion 31 and the sipes 322 of the second land portion 32 are all two-dimensional sipes, and the sipes 332 of the third land portion 33 and the sipes 342 of the fourth land portion 34 are all three-dimensional sipes. Thus, due to a difference in rigidity between the two-dimensional sipes 312 and 322 and the three-dimensional sipes 332 and 342, the rigidity of the first land portion 31 and the second land portion 32 positioned on the inner side in the vehicle width direction is set to be low and the rigidity of the third land portion 33 and the fourth land portion 34 positioned on the outer side in the vehicle width direction is set to be high.

Additionally, with the pneumatic tire 1A, the tread portion has a cap rubber 151 and an under rubber 152 (see FIG. 1). A rubber hardness $H1_{in}$ at −10° C. and a rubber hardness $H2_{in}$ at 20° C. of the cap rubber $151_{in}$ in the inner side region, and a rubber hardness $H1_{out}$ at −10° C. and a rubber hardness $H2_{out}$ at 20° C. of the cap rubber $151_{out}$ in the outer side region have relationships such that $H1_{in}<H1_{out}$ and $H2_{in}<H2_{out}$.

Here, "rubber hardness" refers to JIS-A (Japanese Industrial Standard-A) hardness in accordance with JIS-K6263. In cases where the cap rubber or under rubber in a predetermined region (the center region or the shoulder regions) is formed from a plurality of rubber materials, the rubber hardness is calculated as an average rubber hardness using formula (1) below. In formula (1), Sk represents a cross-sectional area of each of the rubber materials in a cross-sectional view in the tire meridian direction, Hk represents the rubber hardness of each of the rubber materials, and Sa represents a cross-sectional area of the predetermined region in a cross-sectional view in a tire meridian direction.

Rubber hardness $H=(\Sigma Sk \times Hk)/Sa$
(wherein,$k$:1,2,3, . . . ,$n$) (1)

For example, with the configuration of FIG. 1, the cap rubber 151 is formed from an inner side cap rubber $151_{in}$ and an outer side cap rubber $151_{out}$. The inner side cap rubber $151_{in}$ is disposed on an inner side region and the outer side cap rubber $151_{out}$ is disposed on an outer side region. Here, a boundary between the inner side cap rubber $151_{in}$ and the outer side cap rubber $151_{out}$ is positioned under a groove bottom of the second circumferential main groove 22, which is located on the tire equatorial plane CL. The rubber hardnesses $H1_{in}$ and $H2_{in}$ of the inner side cap rubber $151_{in}$ and the rubber hardnesses $H1_{out}$ and $H2_{out}$ of the outer side cap rubber $151_{out}$ have relationships such that $H1_{in}<H1_{out}$ and $H2_{in}<H2_{out}$. Thus, due to a difference in rubber hardnesses of the cap rubbers $151_{in}$ and $151_{out}$, the rigidity of the first land portion 31 and the second land portion 32 positioned in the inner side region is set to be low and the rigidity of the third land portion 33 and the fourth land portion 34 positioned in the outer side region is set to be high.

With the pneumatic tire 1A, the two-dimensional sipes 312 are disposed in the inner side region, and the three-dimensional sipes 332 are disposed in the outer side region. Therefore, rigidity in the inner side region is set to be low and rigidity in the outer side region is set to be high (see FIGS. 1 and 2). Additionally, the rubber hardnesses $H1_{in}$ and $H2_{in}$ in the inner side region and the rubber hardnesses $H1_{out}$ and $H2_{out}$ in the outer side region have relationships such that $H1_{in}<H1_{out}$ and $H2_{in}<H2_{out}$. Therefore, the rigidity in the inner side region is set to be low and the rigidity in the outer side region is set to be high. Thus, synergistic lowering of the rigidity in the inner side region occurs and synergistic increasing of the rigidity in the outer side region occurs. As a result, when the pneumatic tire 1A is mounted on a vehicle such that the inner side region is on an inner side in a vehicle width direction, the inner side region will contribute greatly to enhancing snow steering stability and the outer side region will contribute greatly to enhancing dry steering stability. Thereby, both dry steering stability and snow steering stability of the tire are achieved at high levels.

Note that with the configuration of FIG. 1, a boundary between the inner side cap rubber $151_{in}$ and the outer side cap rubber $151_{out}$ is positioned under a groove bottom of the second circumferential main groove 22, which is located on the tire equatorial plane CL. However, the configuration is not limited thereto, and the boundary between the inner side cap rubber $151_{in}$ and the outer side cap rubber $151_{out}$ may be disposed at a position displaced from under the groove bottom of the second circumferential main groove 22 (not illustrated). In such a configuration, the rubber hardnesses $H1_{in}$ and $H2_{in}$ of the cap rubber of the inner side region and the rubber hardnesses $H1_{out}$ and $H2_{out}$ of the cap rubber of the outer side region are calculated according to formula (1) described above.

Figure 3:
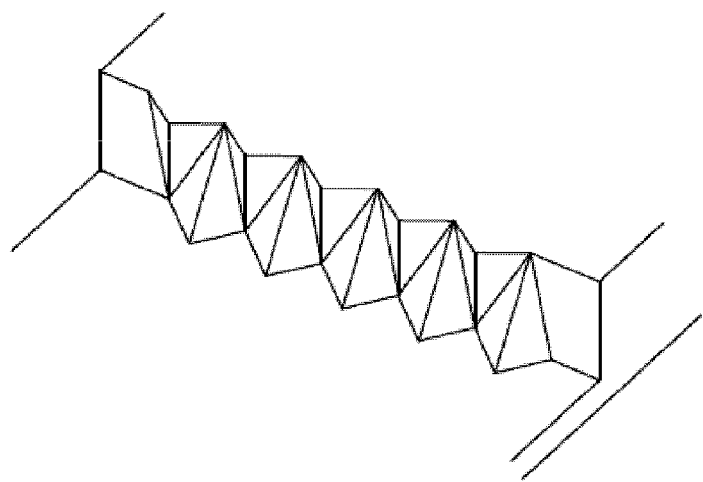
FIG. 3 is an explanatory drawing illustrating an example of a three-dimensional sipe.
Figure 4:
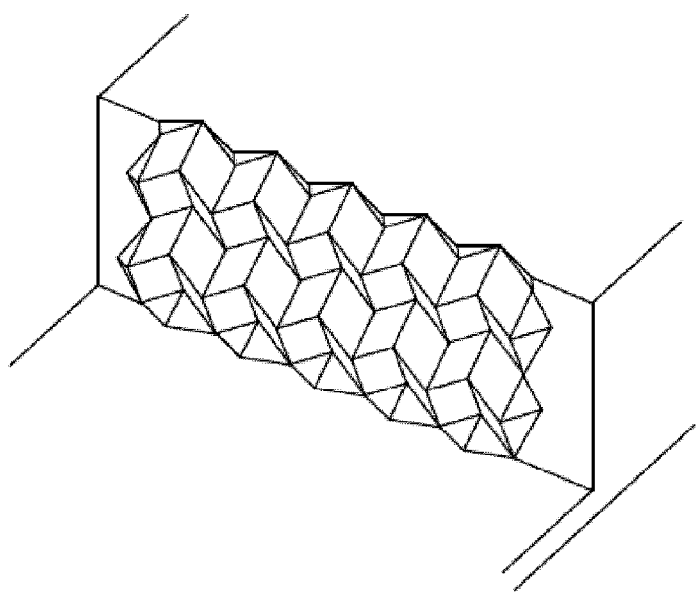
FIG. 4 is an explanatory drawing illustrating an example of a three-dimensional sipe.

FIGS. 3 and 4 are explanatory diagrams illustrating examples of the three-dimensional sipe. These drawings are perspective views of a wall face of the three-dimensional sipe.

With the three-dimensional sipe of FIG. 3, the sipe wall face has a structure in which pyramids and inverted pyramids are connected in the sipe length direction. In other words, the sipe wall face is formed by mutually offsetting pitches of a zigzag form of the tread surface side and a zigzag form of the bottom side in the tire width direction so that mutually opposing protrusions and recesses are formed between the zigzag forms of the tread surface side and the bottom side. Additionally, with these protrusions and recesses, when viewed in a tire rotating direction, the sipe wall face is formed by connecting a protrusion inflection point on the tread surface side to a recess inflection point on the bottom side, a recess inflection point on the tread surface side to a protrusion inflection point on the bottom side, and protrusion inflection points mutually adjacent to the protrusion inflection point on the tread surface side and the protrusion inflection point on the bottom side with ridge lines; and connecting these ridge lines with consecutive planes in the tire width direction. Additionally, a first face of the sipe wall face has a corrugated surface wherein convex pyramids and inverted pyramids thereof are arranged alternating in the tire width direction; and a second face of the sipe wall face has a corrugated surface wherein concave pyramids and inverted pyramids thereof are arranged alternating in the tire width direction. Furthermore, with the sipe wall face, at least the corrugated surfaces disposed at outermost sides of both ends of the sipe are oriented toward an outer side of the blocks. Note that examples of such a three-dimensional sipe include the technology described in Japanese Patent No. 3894743.

Additionally, with the three-dimensional sipe of FIG. 4, the sipe wall face has a structure in which a plurality of prism shapes having a block form are connected in the sipe depth direction and the sipe length direction while inclining with respect to the sipe depth direction. In other words, the sipe wall face has a zigzag form in the tread surface. Additionally, the sipe wall face has bent portions in at least two locations in the tire radial direction in the blocks that bend in the tire circumferential direction and are connected in the tire width direction. Moreover, these bent portions have a zigzag form that oscillates in the tire radial direction. Additionally, while, in the sipe wall face, the oscillation is constant in the tire circumferential direction, an inclination angle in the tire circumferential direction with respect to a normal line direction of the tread surface is configured so as to be smaller at a moiety on the sipe bottom side than at a moiety on the tread surface side; and the oscillation in the tire radial direction of the bent portion is configured so as to be greater at a moiety on the sipe bottom side than at a moiety on the tread surface side. Note that examples of such a three-dimensional sipe include the technology described in Japanese Patent No. 4316452.

With the pneumatic tire 1A, the rubber hardnesses $H1_{in}$ and $H2_{in}$ in the inner side region and the rubber hardnesses $H1_{out}$ and $H2_{out}$ in the outer side region preferably satisfy the conditions: $65 \leq H1_{in} \leq 75$; $62 \leq H2_{in} \leq 72$; $68 \leq H1_{out} \leq 78$; and $65 \leq H2_{out} \leq 75$; along with $3 \leq H1_{out} - H1_{in} \leq 10$; and $3 \leq H2_{out} - H2_{in} \leq 10$. As a result, the relationship between the rubber hardnesses $H1_{in}$ and $H2_{in}$ in the inner side region and the rubber hardnesses $H1_{out}$ and $H2_{out}$ in the outer side region will be made appropriate.

Additionally, with the pneumatic tire 1A, a sipe density $D_{in}$ of the inner side region and a sipe density $D_{out}$ of the outer side region preferably have a relationship such that $1.2 \leq D_{in}/D_{out} \leq 2.0$ (not illustrated). That is, the sipe density $D_{in}$ of the inner side region is preferably greater than the sipe density $D_{out}$ of the outer side region.

Here, "sipe density" refers to a ratio of sipe length to the ground contact area of a land portion. Sipe length increases due to, for example, the sipes being provided with a bending form. Additionally, sipe density can be easily adjusted by, for example, adjusting the sipe length, number of sipes, and the like.

As described above, with the pneumatic tire 1A, the rigidity of the land portions 31 and 32 of the inner side region is set to be low and the rigidity of the land portions 33 and 34 of the outer side region is set to be high due to the disposal of the two-dimensional sipes 312 and 322 and the three-dimensional sipes 332 and 342 and the difference in rubber hardnesses between the cap rubber $151_{in}$ in the inner side region and the cap rubber $151_{out}$ in the outer side region. Thus, by providing the difference between the sipe densities $D_{in}$ and $D_{out}$ as described above, the rigidity of the land portions 31 and 32 of the inner side region can be set to be even lower and the rigidity of the land portions 33 and 34 of the outer side region can be set to be even higher.

Additionally, with the pneumatic tire 1A, a groove area ratio $S_{in}$ of the inner side region and a groove area ratio $S_{out}$ of the outer side region in a tire ground contact patch preferably have a relationship such that $1.2 \leq S_{in}/S_{out} \leq 2.0$, and a total groove area ratio S_t in the tire ground contact patch is preferably within a range $0.25 \leq S\_t \leq 0.38$ (see FIG. 2). As a result, the ratio $S_{in}/S_{out}$ of the groove area ratio $S_{in}$ of the inner side region to the groove area ratio $S_{out}$ of the outer side region, along with the total groove area ratio S_t are made appropriate.

Here, "groove area ratio" is defined as groove area/(groove area+ground contact area). "Groove area" refers to the opening area of the grooves in the contact patch. "Groove" refers to the circumferential grooves and lug grooves in the tread portion and does not include sipes and kerfs. "Ground contact area" refers to the contact area between the tire and the contact patch. Note that the groove area and the ground contact area are measured at a contact surface between a tire and a flat plate in a configuration in which the tire is mounted on a standard rim, filled to a prescribed internal pressure, placed perpendicularly with respect to the flat plate in a static state, and loaded with a load corresponding to a prescribed load. Note that the tire ground contact patch refers to a contact surface between a tire and a flat plate in a configuration in which the tire is mounted on a standard rim, filled to a prescribed internal pressure, placed perpendicularly with respect to the flat plate in a static state, and loaded with a load corresponding to a prescribed load.

Herein, "standard rim" refers to a "standard rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). Also, "prescribed internal pressure" refers to the "maximum air pressure" defined by JATMA, the maximum value of "tire load limits at various cold inflation pressures" defined by TRA, or "inflation pressures" defined by ETRTO. Moreover, "prescribed load" refers to "maximum load capacity" defined by JATMA, the maximum value in "tire load limits at various cold inflation pressures" defined by TRA, or "load capacity" defined by ETRTO. However, with JATMA, in the case of passenger car tires, the prescribed internal pressure is an air pressure of 180 kPa, and the stipulated load is 88% of the maximum load capacity.

Modified Example 1

Figure 5:
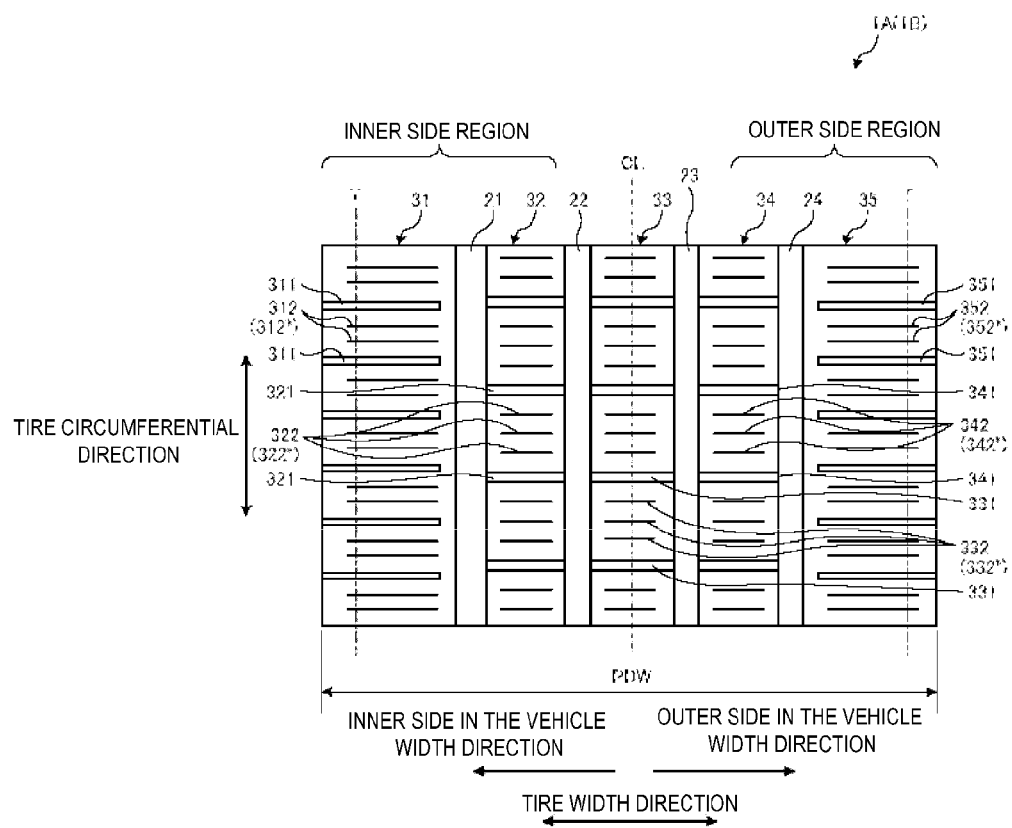
FIG. 5 is an explanatory view illustrating Modified Example 1 (Modified Example 3) of the pneumatic tire depicted in FIG. 1.

FIG. 5 is an explanatory view illustrating Modified Example 1 of the pneumatic tire depicted in FIG. 1.

With the configuration of FIG. 2, three of the circumferential main grooves 21 to 23 are disposed. However, the configuration is not limited to such and three or more of the circumferential main grooves 21 to 24 may be disposed (see FIG. 5).

For example, with Modified Example 1 of FIG. 5, four of the circumferential main grooves 21 to 24 are disposed so as to be left-right symmetrical in left and right regions demarcated by the tire equatorial plane CL. Moreover, three center land portions 32 to 34 and a pair of left and right shoulder land portions 31 and 35 are partitioned by these circumferential main grooves 21 to 24. Here, the four circumferential main grooves 21 to 24 and the five land portions 31 to 35 are called, in order from the inner side in the vehicle width direction toward the outer side in the vehicle width direction, a first land portion 31, a first circumferential main groove 21, a second land portion 32, a second circumferential main groove 22, a third land portion 33, a third circumferential main groove 23, a fourth land portion 34, a fourth circumferential main groove 24, and a fifth land portion 35.

Additionally, the third land portion 33 is on the tire equatorial plane CL, and the boundaries of the inner side region and the outer side region are disposed on the second land portion 32 and the fourth land portion 34, respectively. Thus, the first land portion 31 and a portion of the second land portion 32 belong to the inner side region and a portion of the fourth land portion 34 and the fifth land portion 35 belong to the outer side region. Additionally, each of the second land portion 32 to the fourth land portion 34 has a plurality of lug grooves 321, 331, and 341, respectively, and is configured as a row of blocks.

Additionally, each of the land portions 31 to 35 has a plurality of sipes 312, 322, 332, 342, and 352, respectively. All of the sipes 312 and 322 disposed in the first land portion 31 and the second land portion 32 in the inner side region are two-dimensional sipes and all of the sipes 342 and 352 disposed in the fourth land portion 34 and the fifth land portion 35 in the outer side region are three-dimensional sipes.

Note that the sipes 332 disposed in the third land portion 33 located on the tire equatorial plane CL may be two-dimensional sipes or three-dimensional sipes. Alternatively, a combination of two-dimensional sipes and three-dimensional sipes may be disposed. With a configuration in which all of the sipes 332 disposed in the third land portion 33 are two-dimensional sipes, the snow steering stability of the tire will be enhanced. Conversely, in a configuration in which all the sipes 332 are three-dimensional sipes, the dry steering stability of the tire will be enhanced.

Additionally, the first land portion 31 and the second land portion 32 in the inner side region are formed from the inner side cap rubber $151_{in}$ (rubber hardnesses $H1_{in}$ and $H2_{in}$ satisfy $65 \leq H1_{in} \leq 75$ and $62 \leq H2_{in} \leq 72$), and the fourth land portion 34 and the fifth land portion 35 in the outer side region are formed from the outer side cap rubber $151_{out}$ (rubber hardnesses $H1_{out}$ and $H2_{out}$ satisfy $68 \leq H1_{out} \leq 78$ and $65 \leq H_{out} \leq 75$). Therefore, the rigidity of the first land portion 31 and the second land portion 32 is set to be low and the rigidity of the fourth land portion 34 and the fifth land portion 35 is set to be high.

Note that the third land portion 33 located on the tire equatorial plane CL may be formed from the inner side cap rubber $151_{in}$ and may also be formed from the outer side cap rubber $151_{out}$ (not illustrated). With a configuration in which the third land portion 33 is formed from the inner side cap rubber $151_{in}$ the snow steering stability of the tire will be enhanced. Conversely, in a configuration in which the third land portion 33 is formed from the outer side cap rubber $151_{out}$, the dry steering stability of the tire will be enhanced.

With the pneumatic tire 1A of FIG. 5, each of the center land portions 32 to 34 has the open-structure lug grooves 321 to 341, respectively and, thereby are each formed as a row of blocks. Additionally, the left and right shoulder land portions 31 and 35 each have semi-closed lug grooves 311 and 351 and, thereby are formed into ribs. However, the configuration is not limited thereto, and any of the land portions may have lug grooves with an open structure, or a semi-closed structure, or lug grooves with a closed structure (not illustrated). Moreover, each of the land portions may be formed as a row of blocks or as a rib (not illustrated). Furthermore, any of the land portions may have inclined grooves (not illustrated).

Additionally, with the pneumatic tire 1A of FIG. 5, the sipes 312 to 352 of the land portions 31 to 35 are all closed sipes. However, the configuration is not limited thereto, and any of the sipes 312 to 352 may be open sipes or semi-closed sipes (not illustrated).

Modified Example 2

Figure 6:
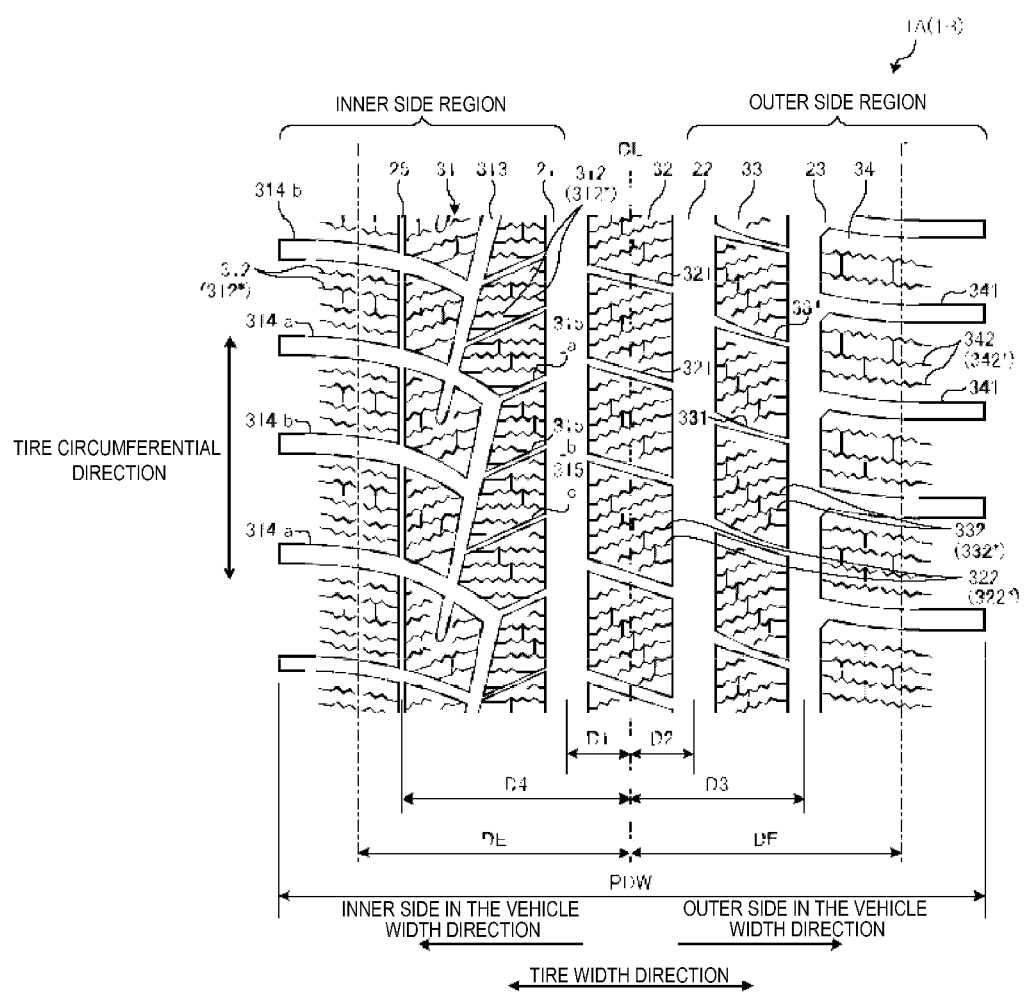
FIG. 6 is an explanatory view illustrating Modified Example 2 (Modified Example 4) of the pneumatic tire depicted in FIG. 1.

FIG. 6 is an explanatory view illustrating Modified Example 2 of the pneumatic tire depicted in FIG. 1. This drawing illustrates a winter tire for use on passenger cars that has an asymmetric tread pattern.

With the configuration of FIG. 2, the pneumatic tire 1A has a left-right symmetric tread pattern in which the sipe configuration and the rubber hardness thereof are left-right asymmetrical. However, the configuration is not limited thereto, and the pneumatic tire 1A may have a left-right asymmetric tread pattern (see FIG. 6).

For example, with the Modified Example 2 of FIG. 6, the pneumatic tire 1A includes three of the circumferential main grooves 21 to 23 extending in the tire circumferential direction, and four of the land portions 31 to 34 partitioned and formed by the circumferential main grooves 21 to 23, in the tread portion. Additionally, a ground contact width of the first land portion 31 in the inner side region is greater than a ground contact width of the fourth land portion 34 in the outer side region. Additionally, the first land portion 31 includes a plurality of inclined grooves 313 inclining with respect to the tire circumferential direction, a plurality of first lug grooves 314_a and 314_b extending in the tire width direction from an outer side of the tire ground contact patch so as to communicate with the inclined grooves 313, and a plurality of second lug grooves 315_a to 315_c extending in the tire width direction so as to connect the inclined grooves 313 and the first circumferential main groove 21. Additionally, three of the first lug grooves 314 are in communication with one of the inclined grooves 313. Note that a number of the first lug grooves 314 is preferably in a range of not less than 3 and not more than 6.

Additionally, with the Modified Example 2 of FIG. 6, a disposal pitch in the tire circumferential direction of the second lug grooves 315_a to 315_c is narrower than a disposal pitch in the tire circumferential direction of the first lug grooves 314_a and 314_b. As a result, water discharge properties and snow traction properties of the first land portion 31 are increased. Additionally, an angle of inclination θ of the inclined grooves 313 with respect to the tire circumferential direction is within a range $10° \leq θ \leq 40°$. As a result, the angle of inclination θ of the inclined grooves 313 is made appropriate. Additionally, each of all or a portion of the second lug grooves 315_b and 315_c among the plurality of second lug grooves 315_a to 315_c includes raised bottom portions (not illustrated) where groove bottoms are raised. As a result, the raised bottom portions will reinforce the rigidity of the land portion 31.

Additionally, a groove width W3 (not illustrated) of the second lug grooves 315_a to 315_c is set to be in a range 2 mm≤W3≤6 mm. As a result, the groove width W3 of the second lug grooves 315_a to 315_c is made appropriate. Moreover, the second land portion 32 and the third land portion 33 each have a plurality of lug grooves 321 and 331 that penetrate the land portions 32 and 33 in the tire width direction, respectively. Additionally, each of all or a portion of the lug grooves among the plurality of lug grooves 321 and 331 includes raised bottom portions (not illustrated) where groove bottoms are raised. As a result, the raised bottom portions will reinforce the rigidity of the land portions 32 and 33.

Additionally, from the tire equatorial plane CL, a distance DE to a tire ground contact edge T, a distance D1 to (a groove center line of) the first circumferential main groove 21 partitioning the first land portion 31, and a distance D3 to the third circumferential main groove 23 partitioning the fourth land portion 34 have relationships such that $0.10 \leq D1/DE \leq 0.30$ (preferably $0.15 \leq D1/DE \leq 0.25$) and $0.55 \leq D3/DE \leq 0.75$. Here, it is assumed that the first circumferential main groove 21 and the third circumferential main groove 23 are disposed so as to sandwich the tire equatorial plane CL. As a result, the relationship between the ground contact width of the left and right first land portion 31 and fourth land portion 34 is made appropriate. Note that with the Modified Example 2 of FIG. 6, a distance D2 to the second circumferential main groove 22 from the tire equatorial plane CL is such that D2=D1.

Additionally, the first land portion 31 has a circumferential narrow and shallow groove 25 disposed between the inclined grooves 313 and the tire ground contact edge T and extending in the tire circumferential direction. A groove width W2 (not illustrated) and a groove depth Hd3 (not illustrated) of the circumferential narrow and shallow groove 25 are set to be in ranges 2 mm≤W2≤4 mm and 2 mm≤Hd3≤4 mm. As a result, the snow traction properties will be enhanced due to edge components of the circumferential narrow and shallow groove 25. Note that with the Modified Example 2 of FIG. 6, a distance D4 to the circumferential narrow and shallow groove 25 from the tire equatorial plane CL is such that 0.50≤D4/DE≤0.90.

With the Modified Example 2 of FIG. 6, as described above, the first land portion 31 in the inner side region has a wide structure and the first land portion 31 includes the plurality of inclined grooves 313, the plurality of first lug grooves 314_a and 314_b, and the plurality of second lug grooves 315_a to 315_c. Therefore, the rigidity of this wide first land portion 31 is reduced, and the water discharge properties of the first land portion 31 are ensured. Furthermore, because three or more of the first lug grooves 314_a and 314_b are in communication with one of the inclined grooves 313, the water discharge properties and the snow traction properties of the first land portion 31 are enhanced. As a result, the dry performance, the wet performance, and the snow performance of the tire can be achieved.

Additionally, with the Modified Example 2 of FIG. 6, the land portions 31 to 34 each have the plurality of sipes 312 to 342. Each block of the first land portion 31 partitioned by the inclined grooves 313, the first lug grooves 314_a and 314_b, and the second lug grooves 315_a to 315_c has a plurality of sipes 312. Moreover, not less than 90% of the sipes 312 disposed in the first land portion 31 are constituted by two-dimensional sipes and not less than 90% of the sipes 332 and 342 disposed in the third land portion 33 and the fourth land portion 34 are constituted by three-dimensional sipes. Additionally, the rubber hardnesses $H1_{in}$ and $H2_{in}$ of the cap rubber $151_{in}$ of the first land portion 31 and the rubber hardnesses $H1_{out}$ and $H2_{out}$ of the cap rubber $151_{out}$ of the third land portion 33 and the fourth land portion 34 have relationships such that $H1_{in}<H1_{out}$ and $H2_{in}<H2_{out}$.

Note that the sipes 322 disposed in the second land portion 32 located on the tire equatorial plane CL may be two-dimensional sipes or three-dimensional sipes. Alternatively, a combination of two-dimensional sipes and three-dimensional sipes may be disposed. With a configuration in which all of the sipes 322 disposed in the second land portion 32 are two-dimensional sipes, the snow steering stability of the tire will be enhanced. Conversely, in a configuration in which all the sipes 322 are three-dimensional sipes, the dry steering stability of the tire will be enhanced.

Additionally, the first land portion 31 in the inner side region is formed from the inner side cap rubber $151_{in}$ (rubber hardnesses $H1_{in}$ and $H2_{in}$ satisfy $65 \leq H1_{in} \leq 75$ and $62 \leq H2_{in} \leq 72$), and the third land portion 33 and the fourth land portion 34 in the outer side region are formed from the outer side cap rubber $151_{out}$ (rubber hardnesses $H1_{out}$ and $H2_{out}$ satisfy $68 \leq H1_{out} \leq 78$ and $65 \leq H2_{out} \leq 75$). Therefore, the rigidity of the first land portion 31 is set to be low and the rigidity of the third land portion 33 and the fourth land portion 34 is set to be high.

The second land portion 32 located on the tire equatorial plane CL may be formed from the inner side cap rubber $151_{in}$ and may also be formed from the outer side cap rubber $151_{out}$ (not illustrated). With a configuration in which the second land portion 32 is formed from the inner side cap rubber $151_{in}$, the snow steering stability of the tire will be enhanced. Conversely, in a configuration in which the second land portion 32 is formed from the outer side cap rubber $151_{out}$, the dry steering stability of the tire will be enhanced.

Additionally, with the Modified Example 2 of FIG. 6, the pneumatic tire 1A has an indicator designating a mounting direction on a vehicle in which the first land portion 31 having a wide ground contact width is on the inner side in the vehicle width direction. With typical high-performance vehicles, a configuration is used in which a large negative camber angle is set and, therefore, tire ground contact length of the inner side region in the vehicle width direction increases. Therefore, the snow traction properties are effectively enhanced due to the pneumatic tire 1A being mounted on the vehicle such that the first land portion 31 is on the inner side in the vehicle width direction.

Note that the tire ground contact edge T and the tire ground contact width are designated or measured at a contact surface between a tire and a flat plate in a configuration in which the tire is mounted on a standard rim, filled to a prescribed internal pressure, placed perpendicularly with respect to the flat plate in a static state, and loaded with a load corresponding to a prescribed load.

Effects A

As described above, the pneumatic tire 1A includes the plurality of circumferential main grooves 21 to 23 extending in the tire circumferential direction; and the plurality of land portions 31 to 34 partitioned and formed by the circumferential main grooves 21 to 23 in the tread portion (see FIG. 2). Additionally, each of the plurality of land portions 31 to 34 has the plurality of sipes 312 to 342, respectively. Moreover, not less than 90% of the sipes 312 and 322 disposed in the inner side region are constituted by two-dimensional sipes and not less than 90% of the sipes 332 and 342 disposed in the outer side region are constituted by three-dimensional sipes. Additionally, the tread portion has the cap rubber 151 and the under rubber 152 (see FIG. 1). The rubber hardness $H1_{in}$ at −10° C. and the rubber hardness $H2_{in}$ at 20° C. of the cap rubber $151_{in}$ in the inner side region, and the rubber hardness $H1_{out}$ at −10° C. and the rubber hardness $H2_{out}$ at 20° C. of the cap rubber $151_{out}$ in the outer side region have relationships such that $H1_{in}<H1_{out}$ and $H2_{in}<H2_{out}$.

With the configuration described above, the two-dimensional sipes 312 and 322 are disposed in the inner side region, and the three-dimensional sipes 332 and 342 are disposed in the outer side region. Therefore, the rigidity in the inner side region is set to be low and the rigidity in the outer side region is set to be high (see FIG. 2). Additionally, the rubber hardnesses $H1_{in}$ and $H2_{in}$ in the inner side region and the rubber hardnesses $H1_{out}$ and $H2_{out}$ in the outer side region have relationships such that $H1_{in}<H1_{out}$ and $H2_{in}<H2_{out}$. Therefore, the rigidity in the inner side region is set to be low and the rigidity in the outer side region is set to be high. Thus, synergistic lowering of the rigidity in the inner side region occurs and synergistic increasing of the rigidity in the outer side region occurs. As a result, when the pneumatic tire 1A is mounted on a vehicle such that the inner side region is on the inner side in the vehicle width direction, the inner side region will contribute greatly to enhancing snow steering stability and the outer side region will contribute greatly to enhancing dry steering stability. Such a configuration is advantageous because both dry steering stability and snow steering stability of the tire are achieved at high levels.

Additionally, with the pneumatic tire 1A, the rubber hardnesses $H1_{in}$ and $H2_{in}$ in the inner side region and the rubber hardnesses $H1_{out}$ and $H2_{out}$ in the outer side region satisfy the conditions: $65 \leq H1_{in} \leq 75$; $62 \leq H2_{in} \leq 72$; $68 \leq H1_{out} \leq 78$; and $65 \leq H2_{out} \leq 75$; along with $3 \leq H1_{out} - H1_{in} \leq 10$; and $3 \leq H2_{out} - H2_{in} \leq 10$. With the configuration described above, the ranges of the rubber hardnesses $H1_{in}$ and $H2_{in}$ in the inner side region and the rubber hardnesses $H1_{out}$ and $H2_{out}$ in the outer side region, along with the difference in rubber hardness between the inner side region and the outer side region are made appropriate. Such a configuration is advantageous because both dry steering stability and snow steering stability of the tire are achieved at higher levels.

Additionally, with the pneumatic tire 1A, the sipe density $D_{in}$ of the inner side region and the sipe density $D_{out}$ of the outer side region have a relationship such that $1.2 \leq D_{in} \leq 2.0$. With such a configuration, the ratio $D_{in}/D_{out}$ of the sipe density $D_{in}$ of the inner side region to the sipe density $D_{out}$ of the outer side region is made appropriate. Such a configuration is advantageous because both dry steering stability and snow steering stability of the tire are achieved at higher levels.

Additionally, with the pneumatic tire 1A, the groove area ratio $S_{in}$ of the inner side region and the groove area ratio $S_{out}$ of the outer side region in the tire ground contact patch have a relationship such that $1.2 \leq S_{in}/S_{out} \leq 2.0$, and the total groove area ratio S_t in the tire ground contact patch is within the range $0.25 \leq S\_t \leq 0.38$. With the configuration described above, the ratio $S_{in}/S_{out}$ of the groove area ratio $S_{in}$ in the inner side region to the groove area ratio $S_{out}$ in the outer side region, along with the total groove area ratio S_t are made appropriate. Such a configuration is advantageous because both dry steering stability and snow steering stability of the tire are achieved at higher levels.

Additionally, the pneumatic tire 1A includes three of the circumferential main grooves 21 to 23 and four of the land portions 31 to 34 in the tread portion (see FIG. 6). Additionally, the ground contact width of the first land portion 31 on the ground contact edge T in the inner side region is greater than the ground contact width of the fourth land portion 34 on the ground contact edge T in the outer side region. Additionally, the first land portion 31 includes the plurality of inclined grooves 313 inclining with respect to the tire circumferential direction, the plurality of first lug grooves 314_a and 314_b extending in the tire width direction from the outer side of the tire ground contact patch so as to communicate with the inclined grooves 313, and the plurality of second lug grooves 315_a to 315_c extending in the tire width direction so as to connect the inclined grooves 313 and the circumferential main groove 21. Furthermore, three or more of the first lug grooves 314_a and 314_b are in communication with one of the inclined grooves 313.

With the configuration described above, the first land portion 31 in the inner side region has a wide structure and the first land portion 31 includes the plurality of inclined grooves 313, the plurality of first lug grooves 314_a and 314_b, and the plurality of second lug grooves 315_a to 315_c. Therefore, the rigidity of this wide first land portion 31 is reduced, and the water discharge properties of the first land portion 31 are ensured. Furthermore, because three or more of the first lug grooves 314_a and 314_b are in communication with one of the inclined grooves 313, the water discharge properties and the snow traction properties of the first land portion 31 are enhanced. Such a configuration is advantageous because the dry performance, the wet performance, and the snow performance of the tire can be achieved.

Additionally, the pneumatic tire 1A has the indicator designating the mounting direction (see FIG. 2) on a vehicle wherein the inner side region is on the inner side in the vehicle width direction. With the configuration described above, the inner side region having the low rigidity is disposed on the inner side in the vehicle width direction and the outer side region having the high rigidity is disposed on the outer side in the vehicle width direction. Such a configuration is advantageous because the inner side region will contribute greatly to the snow steering stability, the outer side region will contribute greatly to the dry steering stability, and both dry steering stability and snow steering stability of the tire will be achieved at high levels.

Example A

FIGS. 8a-8c include a table showing the results of performance testing of pneumatic tires according to Embodiment 1 of the present technology.

In the performance testing, a plurality of mutually differing pneumatic tires were evaluated for (1) dry steering stability and (2) snow steering stability (see FIGS. 8a-8c). In these performance tests, pneumatic tires with a tire size of 235/45R19 were assembled on rims with a rim size of 19×8J, inflated to an air pressure of 250 kPa, and loaded with 85% of a "LOAD CAPACITY" stipulated by ETRTO. A sedan type four-wheel drive vehicle with an engine displacement of 3.0 L was used as the test vehicle.

(1) In the evaluations for dry steering stability, the test vehicle on which the pneumatic tires were mounted was driven at a speed of from 60 km/h to 240 km/h on a flat circuit test course. Then the test driver performed a sensory evaluation regarding steering while lane changing and cornering and stability while traveling forward. Results of the evaluations were indexed and the index value of the pneumatic tire of Comparative Example 1 was set as the standard score (100). Higher scores were preferable.

(2) In the evaluations for snow steering stability, the test vehicle on which the pneumatic tires were mounted was driven at a speed of 40 km/h on a handling course in a snow road testing facility, and the test driver performed a sensory evaluation. Results of the evaluations were indexed and the index value of the pneumatic tire of Comparative Example 1 was set as the standard score (100). Higher scores were preferable.

The pneumatic tire 1A of Working Example 1 had the structure of FIG. 1 and the tread pattern of FIG. 2, and included three circumferential main grooves 21 to 23 and four land portions 31 to 34 in the tread portion. Additionally, all of the sipes 312 and 322 in the first land portion 31 and the second land portion 32 in the inner side region were constituted by two-dimensional sipes, and all of the sipes 332 and 342 in the third land portion 33 and the fourth land portion 34 in the outer side region were constituted by three-dimensional sipes. Moreover, the rubber hardnesses $H1_{in}$ and $H2_{in}$ of the cap rubber $151_{in}$ in the inner side region were less than the rubber hardnesses $H1_{out}$ and $H2_{out}$ of the cap rubber $151_{out}$ in the outer side region ($H1_{in} < H1_{out}$ and $H2_{in} < H2_{out}$). Additionally, the sipe density $D_{in}$ of the inner side region was greater than the sipe density $D_{out}$ of the outer side region (1.00<$D_{in}/D_{out}$). Additionally, the groove area ratio $S_{in}$ in the inner side region and the groove area ratio $S_{out}$ in the outer side region of the tire ground contact patch were adjusted by adjusting the groove area or the disposal pitch of the lug grooves of the land portions 31 to 34. The pneumatic tires 1A of Working Examples 2 to 9 are modified examples of the pneumatic tire 1A of Working Example 1.

Additionally, the pneumatic tire 1A of Working Example 10 had the structure illustrated in FIG. 5, and had four circumferential main grooves 21 to 24 and five land portions 31 to 35 in the tread portion. The pneumatic tire 1A of Working Example 11 had the tread pattern of FIG. 6. Moreover, the boundary between the cap rubber $151_{in}$ of the inner side region and the cap rubber $151_{out}$ of the outer side region was on the first circumferential main groove 21. Additionally, all of the sipes 312 of the first land portion 31 were constituted by two-dimensional sipes and all of the sipes 322 to 342 of the second land portion 32 to the fourth land portion 34 were constituted by three-dimensional sipes.

The pneumatic tire of Conventional Example 1 included three circumferential main grooves and four land portions in the tread portion. Additionally, the sipes in each of the land portions were all two-dimensional sipes. Moreover, the rubber hardnesses $H1_{in}$ and $H2_{in}$ of the cap rubber of the land portions in the inner side region were less than the rubber hardnesses $H1_{out}$ and $H2_{out}$ of the cap rubber of the land portions in the outer side region. Additionally, the sipe density $D_{in}$ of the inner side region was greater than the sipe density $D_{out}$ of the outer side region.

In contrast with the pneumatic tire of Conventional Example 1, in the pneumatic tire of Conventional Example 2, the rubber hardnesses $H1_{in}$ and $H2_{in}$ of the cap rubber of the land portions in the inner side region were greater than the rubber hardnesses $H1_{out}$ and $H2_{out}$ of the cap rubber of the land portions in the outer side region. Moreover, the sipe density $D_{in}$ of the inner side region was less than the sipe density $D_{out}$ of the outer side region.

The pneumatic tires of Comparative Examples 1 to 3 differ from the pneumatic tire 1A of Working Example 1 in terms of the sipe form in the land portions in the inner side region and the land portions in the outer side region, and the difference in hardness of the cap rubber.

As is clear from the test results, with the pneumatic tires 1A of Working Examples 1 to 11, compared with the pneumatic tire of the Conventional Example 1, the dry steering stability and the snow steering stability of the tires are enhanced (see FIGS. 8a-8c). Additionally, in a comparison of Working Examples 1 to 3, it is clear that both the dry steering stability and the snow steering stability of the tire are achieved due to the difference in rubber hardness between the inner side region and the outer side region being made appropriate. Additionally, in a comparison of Working Examples 1, 4, and 5, it is clear that both the dry steering stability and the snow steering stability of the tire are achieved due to the ratio $D_{in}/D_{out}$ of the sipe density $D_{in}$ of the inner side region to the sipe density $D_{out}$ of the outer side region being made appropriate. Furthermore, in a comparison of Working Examples 1 and 6 to 9, it is clear that both the dry steering stability and the snow steering stability of the tire are achieved due to the ratio $S_{in}/S_{out}$ of the groove area ratio $S_{in}$ in the inner side region to the groove area ratio $S_{out}$ in the outer side region, along with the total groove area ratio S_t being made appropriate.

Pneumatic Tires of Embodiment 2

With the pneumatic tire 1A of Embodiment 1, as described above, not less than 90% of the sipes 312 and 322 disposed in the inner side region are constituted by two-dimensional sipes and not less than 90% of the sipes 332 and 342 disposed in the outer side region are constituted by three-dimensional sipes (see FIGS. 1 and 2). Additionally, the rubber hardness $H1_{in}$ at −10° C. and the rubber hardness $H2_{in}$ at 20° C. of the cap rubber $151_{in}$ in the inner side region, and the rubber hardness $H1_{out}$ at −10° C. and the rubber hardness $H2_{out}$ at 20° C. of the cap rubber $151_{out}$ in the outer side region have relationships such that $H1_{in}<H1_{out}$ and $H2_{in}<H2_{out}$. Moreover, the tire is mounted on a vehicle such that the inner side region is on the inner side in the vehicle width direction.

In contrast with the pneumatic tire 1A of Embodiment 1, in a pneumatic tire 1B of Embodiment 2, the sipe configurations and the rubber hardness configurations of the inner and outer side regions are inverted. That is, not less than 90% of the sipes 312* and 322* disposed in the inner side region are constituted by three-dimensional sipes and not less than 90% of the sipes 332* and 342* disposed in the outer side region are constituted by two-dimensional sipes (see FIGS. 1 and 2). A rubber hardness $H1_{in}$* at −10° C. and a rubber hardness $H2_{in}$* at 20° C. of the cap rubber $151_{in}$* in the inner side region, and a rubber hardness $H1_{out}$* at −10° C. and a rubber hardness $H2_{out}$* at 20° C. of the cap rubber $151_{out}$* in the outer side region have relationships such that $H1_{in}$*>$H1_{out}$* and $H2_{in}$*>$H_{out}$*. Moreover, the tire is mounted on a vehicle such that the inner side region is on the inner side in the vehicle width direction. As a result, the pneumatic tire 1B of Embodiment 2 has different characteristics than the pneumatic tire 1A of Embodiment 1.

A description of the pneumatic tire 1B of Embodiment 2 is given below.

Note that constituents of the pneumatic tire 1B of Embodiment 2 that are identical to those of pneumatic tire 1A of Embodiment 1 are assigned the same reference numerals and descriptions thereof have been omitted. Additionally, constituents that are different are marked and distinguished with an asterisk (*).

Sipe Configuration and Rubber Hardness

With the pneumatic tire 1B, each of the land portions 31 to 34 has a plurality of sipes 312* to 342*, respectively (see FIG. 2). Moreover, not less than 90% of the sipes 312* and 322* disposed in the inner side region are constituted by three-dimensional sipes and not less than 90% of the sipes 332* and 342* disposed in the outer side region are constituted by two-dimensional sipes.

Additionally, with Embodiment 2, each of the land portions 31 to 34 has the plurality of sipes 312* to 342*, respectively. Additionally, the sipes 312* to 342* have a straight form extending in the tire width direction, and are each disposed parallelly in the tire circumferential direction and at a predetermined pitch. Moreover, the sipes 312* to 342* have a closed structure, each terminating within the land portions 31 to 34. Furthermore, the sipes 312* of the first land portion 31 and the sipes 322* of the second land portion 32 are all three-dimensional sipes, and the sipes 332* of the third land portion 33 and the sipes 342* of the fourth land portion 34 are all two-dimensional sipes. Thus, due to a difference in rigidity between the three-dimensional sipes 312* and 322* and the two-dimensional sipes 332* and 342*, the rigidity of the first land portion 31 and the second land portion 32 positioned on the inner side in the vehicle width direction is set to be high and the rigidity of the third land portion 33 and the fourth land portion 34 positioned on the outer side in the vehicle width direction is set to be low.

Additionally, with the pneumatic tire 1B, the tread portion has a cap rubber 151 and an under rubber 152 (see FIG. 1). A rubber hardness $H1_{in}*$ at $-10°$ C. and a rubber hardness $H2_{in}*$ at 20° C. of the cap rubber $151_{in}*$ in the inner side region, and a rubber hardness $H1_{out}*$ at $-10°$ C. and a rubber hardness $H2_{out}*$ at 20° C. of the cap rubber $151_{out}*$ in the outer side region have relationships such that $H1_{in}*>H1_{out}*$ and $H2_{in}*>H2_{out}*$ (see FIG. 1).

For example, in Embodiment 2, the cap rubber 151 is formed from an inner side cap rubber $151_{in}*$ and an outer side cap rubber $151_{out}*$. The inner side cap rubber $151_{in}*$ is disposed on an inner side region and the outer side cap rubber $151_{out}*$ is disposed on an outer side region. Here, a boundary between the inner side cap rubber $151_{in}*$ and the outer side cap rubber $151_{out}*$ is positioned under a groove bottom of the second circumferential main groove 22, which is located on the tire equatorial plane CL. The rubber hardnesses $H1_{in}*$ and $H2_{in}*$ of the inner side cap rubber $151_{in}*$ and the rubber hardnesses $H1_{out}*$ and $H2_{out}*$ of the outer side cap rubber $151_{out}*$ have relationships such that $H1_{in}*>H1_{out}*$ and $H2_{in}*>H2_{out}*$. Thus, due to a difference in rubber hardnesses of the cap rubbers $151_{in}*$ and $151_{out}*$, the rigidity of the first land portion 31 and the second land portion 32 positioned on the inner side region is set to be high and the rigidity of the third land portion 33 and the fourth land portion 34 positioned in the outer side region is set to be low.

With the pneumatic tire 1B, the three-dimensional sipes 312* and 322* are disposed in the inner side region, and the two-dimensional sipes 332* and 342* are disposed in the outer side region. Therefore, rigidity in the inner side region is set to be high and rigidity in the outer side region is set to be low (see FIG. 2). Moreover, the rubber hardnesses $H1_{in}*$ and $H2_{in}*$ in the inner side region and the rubber hardness $H1_{out}*$ and $H2_{out}*$ in the outer side region have relationships such that $H1_{in}*>H1_{out}*$ and $H2_{in}*>H2_{out}*$. Therefore, the rigidity in the inner side region is set to be high and the rigidity in the outer side region is set to be low. Thus, synergistic increasing of the rigidity in the inner side region occurs and synergistic lowering of the rigidity in the outer side region occurs. As a result, when the pneumatic tire 1B is mounted on a vehicle such that the inner side region is on an inner side in a vehicle width direction, the inner side region will contribute greatly to enhancing dry steering stability and the outer side region will contribute greatly to enhancing snow steering stability. Therefore, both dry steering stability and snow steering stability of the tire are achieved at high levels.

Additionally, with the configuration described above, the rigidity in the inner side region is high and, therefore, when the pneumatic tire 1B is mounted on a vehicle having a large camber angle such that the inner side region is on the inner side in the vehicle width direction, the rigidity of the tread portion can be highly maintained. As a result, high-speed durability performance of the tire will be enhanced. Additionally, with the mounting state described above, the tire ground contact length increases on the inner side in the vehicle width direction. As described above, the rigidity in the inner side region will be high, leading to a further enhancement in the dry performance of the tire.

Regarding this point, the pneumatic tire 1B preferably has an indicator designating a mounting direction on a vehicle wherein a camber angle δ (not illustrated) is in a range of $-4°≤δ≤0°$. By mounting the pneumatic tire 1B on a vehicle having the camber angle δ described above, features of the inner side region having the high rigidity will be appropriately exhibited and the high-speed durability performance of the tire will be effectively enhanced. Note that the indicator described above can be displayed, for example, by marks or recesses and protrusions provided on the side wall portion of the tire, or in a catalog that is attached to the tire.

In the configuration described above, the rubber hardnesses $H1_{in}*$ and $H2_{in}*$ in the inner side region and the rubber hardnesses $H1_{out}*$ and $H2_{out}*$ in the outer side region preferably satisfy the conditions: $68≤H1_{in}*≤78$; $65≤H2_{in}*≤75$; $65≤H1_{out}*≤75$; and $62≤H2_{out}*≤72$; along with $3≤H1_{in}*-H1_{out}*≤10$; and $3≤H2_{in}*-H2_{out}*≤10$. As a result, the relationship between the rubber hardnesses $H1_{in}*$ and $H2_{in}*$ in the inner side region and the rubber hardnesses $H1_{out}*$ and $H2_{out}*$ in the outer side region will be made appropriate.

Additionally, with the configuration described above, a sipe density $D_{in}*$ of the inner side region and a sipe density $D_{out}*$ of the outer side region preferably have a relationship such that $1.2≤D_{out}*/D_{in}*≤2.0$. That is, the sipe density $D_{in}*$ of the inner side region is preferably less than the sipe density $D_{out}*$ of the outer side region. As a result, the relationship between the sipe density $D_{in}*$ of the inner side region and the sipe density $D_{out}*$ of the outer side region will be made appropriate.

As described above, with the pneumatic tire 1B, the rigidity of the land portions 31 and 32 of the inner side region is set to be high and the rigidity of the land portions 33 and 34 of the outer side region is set to be low due to the disposal of the three-dimensional sipes 312* and 322* and the two-dimensional sipes 332* and 342* and the difference in rubber hardnesses between the cap rubber $151_{in}*$ in the inner side region and the cap rubber $151_{out}*$ in the outer side region. Thus, by providing the difference between the sipe densities $D_{in}*$ and $D_{out}*$ as described above, the rigidity of the land portions 31 and 32 of the inner side region can be set to be even higher and the rigidity of the land portions 33 and 34 of the outer side region can be set to be even lower.

Additionally, with the configuration described above, a groove area ratio $S_{in}*$ of the inner side region and a groove area ratio $S_{out}*$ of the outer side region in a tire ground contact patch preferably have a relationship such that $1.2≤S_{out}*/S_{in}*≤2.0$, and a total groove area ratio $S\_t$ in the tire ground contact patch is preferably within a range $0.25≤S\_t≤0.38$. As a result, a ratio $S_{out}*/S_{in}*$ of the groove area ratio $S_{out}*$ of the outer side region to the groove area ratio $S_{in}*$ of the inner side region, along with the total groove area ratio $S\_t$ are made appropriate.

Additionally, with the pneumatic tire 1B, a groove width $W1*$ of the lug grooves 311 of the inner side region (not illustrated) and a groove width $W2*$ of the lug grooves 341 of the outer side region (not illustrated) preferably have a relationship such that $0.5$ mm$≤W2*-W1*≤2.0$ mm. In the configuration described above, the lug grooves 311 of the inner side region are narrow and, therefore, the dry steering stability and the high-speed durability performance of the tire are enhanced. Additionally, the lug grooves 341 of the outer side region are wide and, therefore, the snow performance of the tire is enhanced.

Additionally, with the pneumatic tire 1B, a groove depth $Hd1*$ (not illustrated) of the lug grooves 311 of the inner side region and a groove depth $Hd2*$ (not illustrated) of the lug grooves 341 of the outer side region preferably have a relationship such that $1.0$ mm$≤Hd2*-Hd1*≤3.0$ mm. In the configuration described above, the groove depth $Hd1*$ of the lug grooves 311 of the inner side region is shallow and, therefore, particularly, the high-speed durability performance of the tire is enhanced. Additionally, the lug grooves 341 of the outer side region are deep and, therefore, the snow performance of the tire is enhanced.

Modified Example 3

With the configuration of FIG. 2, three of the circumferential main grooves 21 to 23 are disposed. However, the configuration is not limited to such and three or more of the circumferential main grooves 21 to 24 may be disposed (see FIG. 5).

For example, with the pneumatic tire 1B of FIG. 5, each of the land portions 31 to 35 has a plurality of sipes 312*, 322*, 332*, 342*, and 352*, respectively. All of the sipes 312* and 322* disposed in the first land portion 31 and the second land portion 32 of the inner side region are three-dimensional sipes and all of the sipes 342* and 352* disposed in the fourth land portion 34 and the fifth land portion 35 of the outer side region are two-dimensional sipes.

Note that the sipes 332* disposed in the third land portion 33 located on the tire equatorial plane CL may be two-dimensional sipes or three-dimensional sipes. Alternatively, a combination of two-dimensional sipes and three-dimensional sipes may be disposed. With a configuration in which all of the sipes 332* disposed in the third land portion 33 are two-dimensional sipes, the snow steering stability of the tire will be enhanced. Conversely, in a configuration in which all the sipes 332* are three-dimensional sipes, the dry steering stability of the tire will be enhanced.

Additionally, the first land portion 31 and the second land portion 32 of the inner side region are formed from the inner side cap rubber $151_{in}$* (rubber hardnesses $H1_{in}$* and $H2_{in}$* satisfy $68 \leq H1_{in}$*$\leq 78$ and $65 \leq H2_{in}$*$\leq 75$) and the fourth land portion 34 and the fifth land portion 35 of the outer side region are formed from the outer side cap rubber $151_{out}$* (rubber hardnesses $H1_{out}$* and $H2_{out}$* satisfy $65 \leq H1_{out}$*$\leq 75$ and $62 \leq H2_{out}$*$\leq 72$). Therefore, the rigidity of the first land portion 31 and the second land portion 32 is set to be high and the rigidity of the fourth land portion 34 and the fifth land portion 35 is set to be low.

Note that the third land portion 33 located on the tire equatorial plane CL may be formed from the inner side cap rubber $151_{in}$*, and may also be formed from the outer side cap rubber $151_{out}$* (not illustrated). With a configuration in which the third land portion 33 is formed from the inner side cap rubber $151_{in}$*, the dry steering stability of the tire will be enhanced. Conversely, in a configuration in which the third land portion 33 is formed from the outer side cap rubber $151_{out}$*, the snow steering stability of the tire will be enhanced.

Additionally, with the pneumatic tire 1B of FIG. 5, the sipes 312* to 352* of the land portions 31 to 35 are all closed sipes. However, the configuration is not limited thereto, and any of the sipes 312* to 352* may be open sipes or semi-closed sipes (not illustrated).

Modified Example 4

With the configuration of FIG. 2, the pneumatic tire 1B has a left-right symmetric tread pattern in which the sipe configuration and the rubber hardness thereof is left-right asymmetrical. However, the configuration is not limited thereto, and the pneumatic tire 1B may have a left-right asymmetric tread pattern (see FIG. 6).

For example, with the pneumatic tire 1B of FIG. 6, each of the land portions 31 to 34 has a plurality of sipes 312* to 342*, respectively. Each block of the first land portion 31 partitioned by the inclined grooves 313, the first lug grooves 314_a and 314_b, and the second lug grooves 315_a to 315_c has a plurality of sipes 312*. Moreover, not less than 90% of the sipes 312* disposed in the first land portion 31 are constituted by three-dimensional sipes and not less than 90% of the sipes 332* and 342* disposed in the third land portion 33 and the fourth land portion 34 are constituted by two-dimensional sipes. Additionally, the rubber hardnesses $H1_{in}$* and $H2_{in}$* of the cap rubber $151_{in}$* of the first land portion 31 and the rubber hardnesses $H1_{out}$* and $H2_{out}$* of the cap rubber $151_{out}$* of the third land portion 33 and the fourth land portion 34 have relationships such that $H1_{in}$*>$H1_{out}$* and $H1_{in}$*>$H2_{out}$*.

Note that the sipes 322* disposed in the second land portion 32 located on the tire equatorial plane CL may be two-dimensional sipes or three-dimensional sipes. Alternatively, a combination of two-dimensional sipes and three-dimensional sipes may be disposed. With a configuration in which all of the sipes 322* disposed in the second land portion 32 are two-dimensional sipes, the snow steering stability of the tire will be enhanced. Conversely, in a configuration in which all the sipes 322* are three-dimensional sipes, the dry steering stability of the tire will be enhanced.

Additionally, the first land portion 31 of the inner side region is formed from the inner side cap rubber $151_{in}$* (rubber hardnesses $H1_{in}$* and $H2_{in}$* satisfy $68 \leq H1_{in}$*$\leq 78$ and $65 \leq H2_{in}$*$\leq 75$) and the third land portion 33 and the fourth land portion 34 of the outer side region are formed from the outer side cap rubber $151_{out}$* (rubber hardnesses $H1_{out}$* and $H2_{out}$* satisfy $65 \leq H1_{out}$*$\leq 75$ and $62 \leq H2_{out}$*$\leq 72$). Therefore, the rigidity of the first land portion 31 is set to be high and the rigidity of the third land portion 33 and the fourth land portion 34 is set to be low.

The second land portion 32 located on the tire equatorial plane CL may be formed from the inner side cap rubber $151_{in}$*, and may also be formed from the outer side cap rubber $151_{out}$* (not illustrated). With a configuration in which the third land portion 33 is formed from the inner side cap rubber $151_{in}$*, the dry steering stability of the tire will be enhanced. Conversely, in a configuration in which the third land portion 33 is formed from the outer side cap rubber $151_{out}$*, the snow steering stability of the tire will be enhanced.

Additionally, with the Modified Example 4 of FIG. 6, the pneumatic tire 1B has an indicator designating a mounting direction on a vehicle in which the first land portion 31 having a wide ground contact width is on the inner side in the vehicle width direction. With typical high-performance vehicles, a configuration is used in which a high negative camber angle is set and, therefore, tire ground contact length of the inner side region in the vehicle width direction increases. Therefore, the snow traction properties are effectively enhanced due to the pneumatic tire 1B being mounted on the vehicle such that the first land portion 31 is on the inner side in the vehicle width direction. Additionally, as described above, the rigidity of the first land portion 31 is high and, therefore, by mounting the tire so that the first land portion 31 is on the inner side in the vehicle width direction, the rigidity of the tread portion can be highly maintained. As a result, high-speed durability performance of the tire will be enhanced.

Modified Example 5

Figure 7:
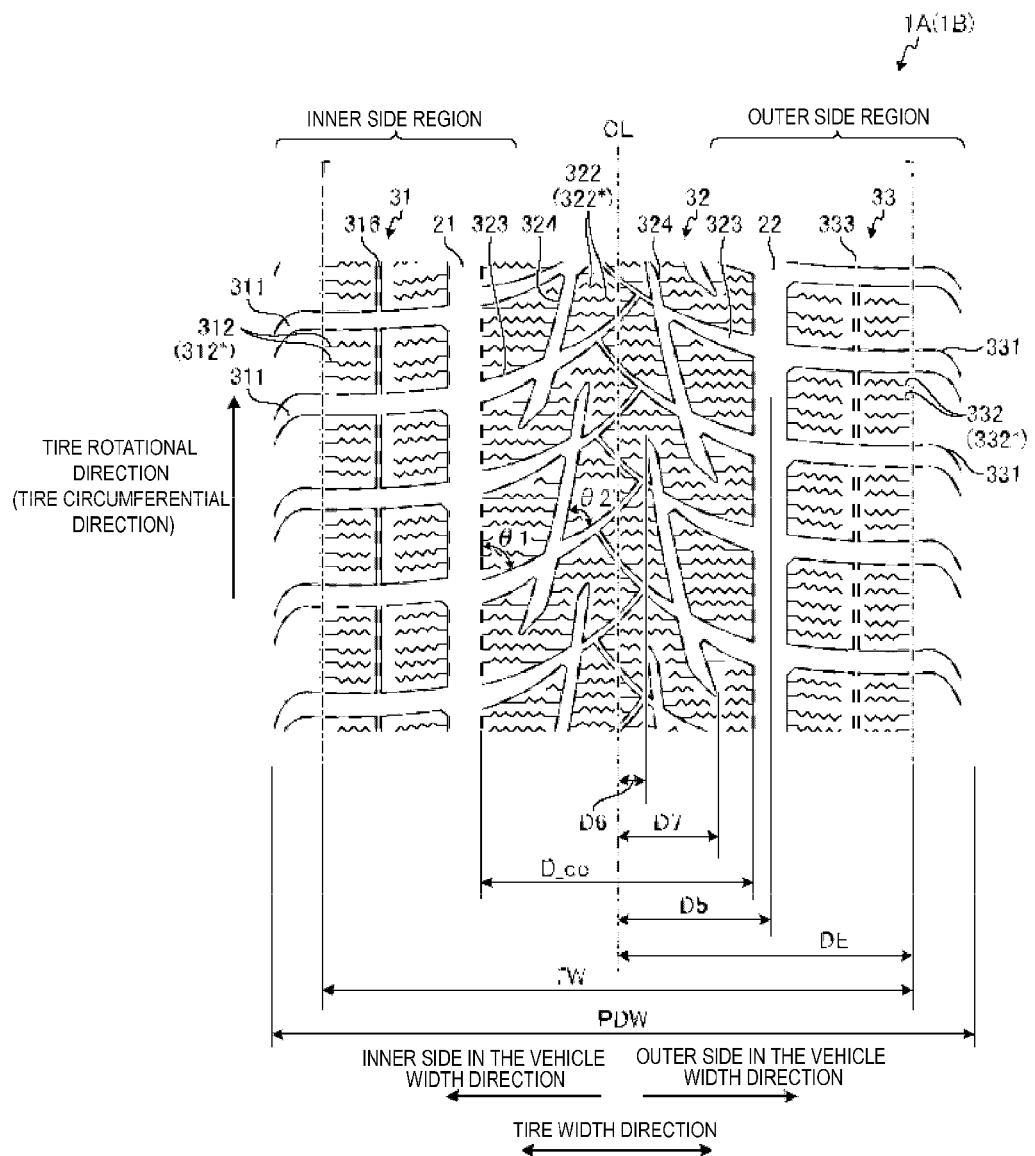
FIG. 7 is an explanatory view illustrating a Modified Example 5 of the pneumatic tire depicted in FIG. 1.

FIG. 7 is an explanatory view illustrating Modified Example 5 of the pneumatic tire depicted in FIG. 1. This drawing illustrates a winter tire for use on passenger cars that has a directional tread pattern.

As illustrated in FIG. 7, the pneumatic tire 1B may have a directional tread pattern. Note that the pneumatic tire 1B described above has an indicator of rotational direction based on the forward direction of the vehicle due to such tires generally having an indicator of the mounting direction of the tire on a vehicle.

For example, with Modified Example 5 of FIG. 7, the pneumatic tire 1B includes two of the circumferential main grooves 21 and 22 extending in the tire circumferential direction, and three of the land portions 31 to 33 partitioned and formed by the circumferential main grooves 21 and 22. Specifically, the two circumferential main grooves 21 and 22 are disposed so as to be left-right symmetric in left and right regions demarcated by the tire equatorial plane CL. Moreover, one center land portion 32 and a pair of left and right shoulder land portions 31 and 33 are partitioned by these circumferential main grooves 21 and 22. Additionally, a boundary of the inner side region and a boundary of the outer side region are located on the center land portion 32. Therefore, the left and right circumferential main grooves 21 and 22 are disposed in the inner side region and the outer side region, respectively.

Here, the left and right circumferential main grooves 21 and 22 outermost in the tire width direction are called "outermost circumferential main grooves." A region on an inner side in the tire width direction of the tread portion, demarcated by groove center lines of the left and right outermost circumferential main grooves is a "center region," and left and right regions on outer sides in the tire width direction are called "shoulder regions."

Additionally, the tire equatorial plane CL is positioned in a center portion of the center land portion 32. Moreover, a distance D5 from the tire equatorial plane CL to the groove center line of a first circumferential main groove 21 (or a second circumferential main groove 22) and a distance DE from the tire equatorial plane CL to the left and right tire ground contact edges T have a relationship such that $0.40 \leq D5/DE \leq 0.60$.

Additionally, the center land portion 32 has a rib-like structure and includes a plurality of main inclined grooves 323 and a plurality of minor inclined grooves 324.

The main inclined grooves 323 extend while inclining with respect to the tire circumferential direction in a form so as be oriented in a single direction in the tire circumferential direction and to become separated from the tire equatorial plane CL. Additionally, the plurality of main inclined grooves 323 is disposed in the tire circumferential direction at a predetermined pitch and is disposed alternately in the tire circumferential direction on both sides of the tire equatorial plane CL. Moreover, a first end (trailing end with respect to the tire rotational direction) of each of the main inclined grooves 323 is in communication with the left or right circumferential main groove 21 or 22. Furthermore, an angle θ1 that the main inclined grooves 323 form with the circumferential main groove 21, at the first end of the main inclined grooves 323, is within a range $56° \leq θ1 \leq 76°$. Moreover, a second end (leading end with respect to the tire rotational direction) of each of the main inclined grooves 323 crosses the tire equatorial plane CL and is in communication with another of the main inclined grooves 323. Furthermore, an angle θ2 that the main inclined grooves 323 form with the minor inclined grooves 324, at the second end of the main inclined grooves 323, is within a range $37° \leq θ2 \leq 57°$. Additionally, the plurality of main inclined grooves 323 form a zigzag-shape center groove extending along the tire circumferential direction on the tire equatorial plane CL. A groove width of each of the main inclined grooves 323 at a portion constituting the center groove is not less than 2 mm and not more than 6 mm, and a groove depth at the same portion is not less than 2 mm and not more than 6 mm.

The minor inclined grooves 324 extend while inclining with respect to the tire circumferential direction in a form so as be oriented in a single direction in the tire circumferential direction and to become separated from the tire equatorial plane CL. Additionally, each of the plurality of minor inclined grooves 324 intersects two of the main inclined grooves 323 and both ends thereof terminate within the center land portion 32. Note that each of the plurality of minor inclined grooves 324 may intersect three or more of the main inclined grooves 323 (not illustrated). Additionally, the plurality of minor inclined grooves 324 is disposed in the tire circumferential direction at a predetermined pitch and is disposed alternately in the tire circumferential direction on both sides of the tire equatorial plane CL. Moreover, a distance D6 from the tire equatorial plane CL to the end on the inner side in the tire width direction of the minor inclined grooves 324 and the distance DE from the tire equatorial plane CL to the tire ground contact edge T have a relationship such that $0.05 \leq D6/DE \leq 0.25$. Moreover, a distance D7 from the tire equatorial plane CL to the end on the outer side in the tire width direction of the minor inclined grooves 324 and the distance DE from the tire equatorial plane CL to the tire ground contact edge T have a relationship such that $0.25 \leq D7/DE \leq 0.45$.

The left and right shoulder land portions 31 and 33 each have a plurality of lug grooves 311 and 331 and circumferential narrow grooves 316 and 333, respectively.

Each of the lug grooves 311 (331) has a first end that is in communication with the circumferential main groove 21 (22) and a second end that crosses the tire ground contact edge T and extends in the tire width direction. Additionally, each of the lug grooves 311 (331) is in communication with the main inclined grooves 323 via the circumferential main groove 21 (22). That is, the lug grooves 311 (331) and the main inclined grooves 323 have opposing opening portions facing the circumferential main groove 21 (22).

Additionally, with the Modified Example 5 of FIG. 7, the circumferential narrow grooves 316 and 333 are straight-shape narrow grooves extending in the tire circumferential direction. A groove width of the circumferential narrow grooves 316 and 333 is set to be within a range of not less than 2 mm and not more than 4 mm. Additionally, a groove depth of the circumferential narrow grooves 316 and 333 is set to be within a range of not less than 2 mm and not more than 4 mm.

Additionally, a ground contact width D_ce in the center region is the same as a width of the center land portion 32 partitioned by the left and right circumferential main grooves 21 and 22 (see FIG. 7). Moreover, groove areas of the main inclined grooves 323 and the minor inclined grooves 324 are included and the groove area of the circumferential main grooves 21 and 22 are not included in a groove area within the ground contact width D_ce of the center region. On the other hand, the groove area of the left and right circumferential main grooves 21 and 22, and the groove areas of the main inclined grooves 323 and the minor inclined grooves 324 are included in a total groove area in the tire ground contact patch. Based on this, a groove area ratio S_ce within the ground contact width D_ce in the center region of the tire ground contact patch and the total groove area ratio S_t in the tire ground contact patch are calculated and optimized so as to be within the ranges described above.

With the Modified Example 5 of FIG. 7, as described above, the center land portion 32 includes the main inclined grooves 323 and the minor inclined grooves 324 that extend toward the outer side in the tire width direction from the vicinity of the tire equatorial plane CL. Therefore, the water discharge performance and the snow discharge performance of the tire are enhanced. Such a configuration is advantageous because the dry steering stability and the snow steering stability are enhanced. Additionally, the minor inclined grooves 324 intersect at least two of the main inclined grooves 323 and are configured so that both ends thereof terminate within the center land portion 32. Moreover, the main inclined grooves 323 and the minor inclined grooves 324 are disposed alternately in the tire circumferential direction. Therefore, the rigidity of the tread portion is maintained. As a result, the snow steering stability can be enhanced while appropriately ensuring the dry steering stability.

Additionally, with the Modified Example 5 of FIG. 7, the center land portion 32 and the left and right shoulder land portions 31 and 33 each include the plurality of sipes 312*, 322* and 332*. Moreover, all of the sipes 312* disposed in the shoulder land portion 31 in the inner side region are three-dimensional sipes and all of the sipes 332* disposed in the shoulder land portion 33 in the outer side region are two-dimensional sipes. As a result, not less than 90% of the sipes 312* and 322* in the inner side region are constituted by three-dimensional sipes and not less than 90% of the sipes 332* and 322* in the outer side region are constituted by two-dimensional sipes.

Note that the sipes 322* disposed in the center land portion 32 may be two-dimensional sipes or three-dimensional sipes. Alternatively, a combination of two-dimensional sipes and three-dimensional sipes may be disposed. With a configuration in which all of the sipes 322* disposed in the center land portion 32 are two-dimensional sipes, the snow steering stability of the tire will be enhanced. Conversely, in a configuration in which all the sipes 322* are three-dimensional sipes, the dry steering stability of the tire will be enhanced.

Additionally, the shoulder land portion 31 in the inner side region is formed from the inner side cap rubber $151_{in}$* (rubber hardnesses $H1_{in}$* and $H2_{in}$* satisfy $68 \leq H1_{in}$*$\leq 78$ and $65 \leq H2_{in}$*$\leq 75$) and the shoulder land portion 33 in the outer side region is formed from the outer side cap rubber $151_{out}$* (rubber hardnesses $H1_{out}$* and $H2_{out}$* satisfy $65 \leq H1_{out}$*$\leq 75$ and $62 \leq H2_{out}$*$\leq 72$). Therefore, the rigidity of the shoulder land portion 31 in the inner side region is set to be high and the rigidity of the shoulder land portion 33 in the outer side region is set to be low.

Note that the center land portion 32 may be formed from the inner side cap rubber $151_{in}$*, and may also be formed from the outer side cap rubber $151_{out}$* (not illustrated). With a configuration in which the center land portion 32 is formed from the inner side cap rubber $151_{in}$*, the dry steering stability of the tire will be enhanced. Conversely, in a configuration in which the center land portion 32 is formed from the outer side cap rubber $151_{out}$*, the snow steering stability of the tire will be enhanced.

Additionally, with the Modified Example 5 of FIG. 7, the pneumatic tire 1B has an indicator designating a mounting direction on a vehicle in which the inner side region is on the inner side in the vehicle width direction. With typical high-performance vehicles, a configuration is used in which a large negative camber angle is set. Here, as described above, the rigidity of the first land portion 31 is high and, therefore, by mounting the pneumatic tire 1B so that the first land portion 31 is on the inner side in the vehicle width direction, the rigidity of the tread portion can be highly maintained. As a result, high-speed durability performance of the tire will be enhanced.

Effects B

As described above, the pneumatic tire 1B includes the plurality of circumferential main grooves 21 to 23 extending in the tire circumferential direction; and the plurality of land portions 31 to 34 partitioned and formed by the circumferential main grooves 21 to 23 in the tread portion (see FIG. 2). Additionally, each of the plurality of land portions 31 to 34 has the plurality of sipes 312* to 342*, respectively. Moreover, not less than 90% of the sipes 312* and 322* disposed in the inner side region are constituted by three-dimensional sipes and not less than 90% of the sipes 332* and 342* disposed in the outer side region are constituted by two-dimensional sipes. Furthermore, the tread portion has a cap rubber 151 and an under rubber 152. A rubber hardness $H1_{in}$* at −10° C. and a rubber hardness $H2_{in}$* at 20° C. of the cap rubber $151_{in}$* in the inner side region, and a rubber hardness $H1_{out}$* at −10° C. and a rubber hardness $H2_{out}$* at 20° C. of the cap rubber $151_{out}$* in the outer side region have relationships such that $H1_{in}$*$>H1_{out}$* and $H2_{in}$*$>H2_{out}$* (see FIG. 1).

With the configuration described above, the three-dimensional sipes 312* and 322* are disposed in the inner side region, and the two-dimensional sipes 332* and 342* are disposed in the outer side region (see FIG. 2). Therefore, the rigidity in the inner side region is set to be high and the rigidity in the outer side region is set to be low. Moreover, the rubber hardnesses $H1_{in}$* and $H2_{in}$* in the inner side region and the rubber hardnesses $H1_{out}$* and $H2_{out}$* in the outer side region have relationships such that $H1_{in}$*$>H1_{out}$* and $H2_{in}$*$>H2_{out}$*. Therefore, the rigidity in the inner side region is set to be high and the rigidity in the outer side region is set to be low. Thus, synergistic increasing of the rigidity in the inner side region occurs and synergistic lowering of the rigidity in the outer side region occurs. As a result, when the pneumatic tire 1B is mounted on a vehicle such that the inner side region is on an inner side in a vehicle width direction, the inner side region will contribute greatly to enhancing dry steering stability and the outer side region will contribute greatly to enhancing snow steering stability. Such a configuration is advantageous because both dry steering stability and snow steering stability of the tire are achieved at high levels.

Additionally, with the configuration described above, as described above, the rigidity in the inner side region is high and, therefore, when the pneumatic tire 1B is mounted on a vehicle having a large camber angle such that the inner side region is on the inner side in the vehicle width direction, the rigidity of the tread portion can be highly maintained. Such a configuration is advantageous because the high-speed durability performance of the tire is enhanced. Additionally, with the mounting state described above, the tire ground contact length increases on the inner side in the vehicle width direction. Here, as described above, the rigidity in the inner side region will be high, which is advantageous because the dry performance of the tire is further enhanced.

Additionally, with the pneumatic tire 1B, the rubber hardnesses $H1_{in}$* and $H2_{in}$* in the inner side region and the rubber hardnesses $H1_{out}$* and $H2_{out}$* in the outer side region satisfy the conditions: $68 \leq H1_{in}$*$\leq 78$; $65 \leq H2_{in}$*$\leq 75$; $65 \leq H1_{out}$*$\leq 75$; and $62 \leq H2_{out}$*$\leq 72$; along with $3 \leq H1_{in}$*−

$H1_{out}^* \leq 10$; and $3 \leq H2_{in}^* - H2_{out}^* \leq 10$. With the configuration described above, the ranges of the rubber hardnesses $H1_{in}^*$ and $H2_{in}^*$ in the inner side region and the rubber hardnesses $H1_{out}^*$ and $H2_{out}^*$ in the outer side region, along with the difference in rubber hardness between the inner side region and the outer side region are made appropriate. Such a configuration is advantageous because both dry steering stability and snow steering stability of the tire are achieved at higher levels.

Additionally, with the pneumatic tire 1B, the sipe density $D_{in}^*$ of the inner side region and the sipe density $D_{out}^*$ of the outer side region have a relationship such that $1.2 \leq D_{out}^*/D_{in}^* \leq 2.0$. With such a configuration, a ratio $D_{out}^*/D_{in}^*$ of the sipe density $D_{out}^*$ of the outer side region to the sipe density $D_{in}^*$ of the inner side region is made appropriate. Such a configuration is advantageous because both dry steering stability and snow steering stability of the tire are achieved at higher levels.

Additionally, with the pneumatic tire 1B, the groove area ratio $S_{in}^*$ of the inner side region and the groove area ratio $S_{out}^*$ of the outer side region in the tire ground contact patch have a relationship such that $1.2 \leq S_{out}^*/S_{in}^* \leq 2.0$, and the total groove area ratio $S\_t$ in the tire ground contact patch is within the range $0.25 \leq S\_t \leq 0.38$. With the configuration described above, the ratio $S_{in}^*/S_{out}^*$ of the groove area ratio $S_{in}^*$ in the inner side region to the groove area ratio $S_{out}^*$ in the outer side region, along with the total groove area ratio $S\_t$ are made appropriate. Such a configuration is advantageous because both dry steering stability and snow steering stability of the tire are achieved at higher levels.

Additionally, the pneumatic tire 1B includes lug grooves 311 and 341, which open to the tire ground contact edge T, in the inner side region and the outer side region, respectively (see FIG. 2). Additionally, a groove width W1* of the lug grooves 311 of the inner side region and a groove width W2* of the lug grooves 341 of the outer side region have a relationship such that $0.5 \text{ mm} \leq W2^* - W1^* \leq 2.0 \text{ mm}$. Such a configuration is advantageous because the lug grooves 311 of the inner side region are narrow and, therefore, the dry steering stability and the high-speed durability performance of the tire are enhanced. Moreover, such a configuration is advantageous because the lug grooves 341 of the outer side region are wide and, therefore, the snow performance of the tire is enhanced.

Additionally, with the pneumatic tire 1B, a groove depth Hd1* of the lug grooves 311 of the inner side region and a groove depth Hd2* of the lug grooves 341 of the outer side region have a relationship such that $1.0 \text{ mm} \leq Hd2^* - Hd1^* \leq 3.0 \text{ mm}$. Such a configuration is advantageous because the lug grooves 311 of the inner side region are shallow and, therefore, particularly, the high-speed durability performance of the tire is enhanced. Moreover, such a configuration is advantageous because the lug grooves 341 of the outer side region are deep and, therefore, the snow performance of the tire is enhanced.

Additionally, the pneumatic tire 1B includes three of the circumferential main grooves 21 to 23 and four of the land portions 31 to 34 in the tread portion (see FIG. 6). Additionally, the ground contact width of the first land portion 31 on the ground contact edge T in the inner side region is greater than the ground contact width of the fourth land portion 34 on the ground contact edge T in the outer side region. Additionally, the first land portion 31 includes the plurality of inclined grooves 313 inclining with respect to the tire circumferential direction, the plurality of first lug grooves 314_a and 314_b extending in the tire width direction from the outer side of the tire ground contact patch so as to communicate with the inclined grooves 313, and the plurality of second lug grooves 315_a to 315_c extending in the tire width direction so as to connect the inclined grooves 313 and the circumferential main groove 21. Furthermore, three or more of the first lug grooves 314_a and 314_b are in communication with one of the inclined grooves 313.

With the configuration described above, the first land portion 31 in the inner side region has a wide structure and the first land portion 31 includes the plurality of inclined grooves 313, the plurality of first lug grooves 314_a and 314_b, and the plurality of second lug grooves 315_a to 315_c. Therefore, the rigidity of this wide first land portion 31 is reduced, and the water discharge properties of the first land portion 31 are ensured. Furthermore, because three or more of the first lug grooves 314_a and 314_b are in communication with one of the inclined grooves 313, the water discharge properties and the snow traction properties of the first land portion 31 are enhanced. Such a configuration is advantageous because the dry performance, the wet performance, and the snow performance of the tire can be achieved.

Additionally, the pneumatic tire 1B includes the one center land portion 32 partitioned and formed by the left and right outermost circumferential main grooves 21 and 22 in the center region (see FIG. 7). The center land portion 32 has the plurality of main inclined grooves 323 and the plurality of minor inclined grooves 324 arranged in the tire circumferential direction. Moreover, the plurality of main inclined grooves 323 each extend while inclining with respect to the tire circumferential direction in a form so as be oriented in a single direction in the tire circumferential direction and to become separated from a tire equatorial plane CL. Additionally, a first end of each of the plurality of main inclined grooves 323 is in communication with the left or right outermost circumferential main groove 21 or 22. Furthermore, the plurality of main inclined grooves 323 is disposed alternately in the tire circumferential direction on both sides of the tire equatorial plane CL. Moreover, the plurality of minor inclined grooves 324 each extend while inclining with respect to the tire circumferential direction in a form so as be oriented in a single direction in the tire circumferential direction and to become separated from a tire equatorial plane CL. Additionally, each of the plurality of minor inclined grooves 324 intersects two of the main inclined grooves 323 and 323, and both ends thereof terminate within the center land portion 32. Additionally, the plurality of minor inclined grooves 324 is disposed alternately in the tire circumferential direction on both sides of the tire equatorial plane CL.

With the configuration described above, the center land portion 32 includes the main inclined grooves 323 and the minor inclined grooves 324 that extend toward the outer side in the tire width direction from the vicinity of the tire equatorial plane CL. Therefore, the water discharge performance and the snow discharge performance of the tire are enhanced. Such a configuration is advantageous because the dry steering stability and the snow steering stability are enhanced.

Additionally, the pneumatic tire 1B has the indicator designating the mounting direction (see FIG. 2) on a vehicle wherein the inner side region is on the inner side in the vehicle width direction. With the configuration described above, the inner side region having the high rigidity is disposed on the inner side in the vehicle width direction and the outer side region having the low rigidity is disposed on the outer side in the vehicle width direction. Such a configuration is advantageous because the inner side region will contribute greatly to the dry steering stability, the outer side region will contribute greatly to the snow steering stability, and both dry steering stability and snow steering stability of the tire will be achieved at high levels.

The pneumatic tire 1B has an indicator designating a mounting direction on a vehicle wherein a camber angle δ (not illustrated) is in a range of −4°≤δ≤0°. Such a configuration is advantageous because features of the inner side region having the high rigidity will be appropriately exhibited and the high-speed durability performance of the tire will be effectively enhanced.

Example B

FIG. 9 is a table showing the results of performance testing of pneumatic tires according to Embodiment 2 of the present technology.

In the performance testing, a plurality of mutually differing pneumatic tires were evaluated for (1) dry steering stability, (2) snow steering stability, and (3) high-speed durability performance (see FIG. 9). In these performance tests, pneumatic tires with a tire size of 235/45R19 were assembled on rims with a rim size of 19×8J, inflated to an air pressure of 250 kPa, and loaded with 85% of a "LOAD CAPACITY" stipulated by ETRTO. A sedan type four-wheel drive vehicle with an engine displacement of 3.0 was used as the test vehicle.

(1) In the evaluations for dry steering stability, the test vehicle on which the pneumatic tires were mounted was driven at a speed of from 60 km/h to 240 km/h on a flat circuit test course. Then the test driver performed a sensory evaluation regarding steering while lane changing and cornering and stability while traveling forward. Results of the evaluations were indexed and the index value of the pneumatic tire of Conventional Example 3 was set as the standard score (100). Higher scores were preferable.

(2) In the evaluations for snow steering stability, the test vehicle on which the pneumatic tires were mounted was driven at a speed of 40 km/h on a handling course in a snow road testing facility, and the test driver performed a sensory evaluation. Results of the evaluations were indexed and the index value of the pneumatic tire of Conventional Example 3 was set as the standard score (100). Higher scores were preferable.

(3) In the evaluations for high-speed durability performance, an indoor drum testing machine was used. The camber angle δ was set to δ=−3°. Running distance to failure of the tire was measured under the following testing conditions: Running speed=300 km/h. Evaluations were performed by indexing the measurement results with Conventional Example 3 as the standard score (100). In these evaluations, higher scores were preferable.

The pneumatic tires 1B of Working Examples 12 to 18 had the structure of FIG. 1 and the tread pattern of FIG. 2, and included three circumferential main grooves 21 to 23 and four land portions 31 to 34 in the tread portion. Additionally, all of the sipes 312* and 322* in the first land portion 31 and the second land portion 32 in the inner side region were constituted by three-dimensional sipes, and all of the sipes 332* and 342* in the third land portion 33 and the fourth land portion 34 in the outer side region were constituted by two-dimensional sipes. Moreover, the rubber hardnesses $H1_{in}^*$ and $H2_{in}^*$ of the cap rubber $151_{in}^*$ in the inner side region were greater than the rubber hardnesses $H1_{out}^*$ and $H2_{out}^*$ of the cap rubber $151_{out}^*$ in the outer side region ($H1_{in}^* > H1_{out}^*$ and $H2_{in}^* > H2_{out}^*$). Additionally, the relationship between the sipe density $D_{in}^*$ of the inner side region and the sipe density $D_{out}^*$ of the outer side region was adjusted. Additionally, the groove area ratio $S_{in}^*$ in the inner side region and the groove area ratio $S_{out}^*$ in the outer side region of the tire ground contact patch were adjusted by adjusting the groove area or the disposal pitch of the lug grooves of the land portions 31 to 34.

The pneumatic tire 1B of Working Example 19 had the tread pattern of FIG. 6. Moreover, the boundary between the cap rubber $151_{in}^*$ of the inner side region and the cap rubber $151_{out}^*$ of the outer side region was on the first circumferential main groove 21. Additionally, all of the sipes 312* of the first land portion 31 were constituted by three-dimensional sipes and all of the sipes 322* to 342* of the second land portion 32 to the fourth land portion 34 were constituted by two-dimensional sipes. The pneumatic tire 1B of Working Example 20 had the tread pattern of FIG. 7. Moreover, the boundary between the cap rubber $151_{in}^*$ of the inner side region and the cap rubber $151_{out}^*$ of the outer side region was on the tire equatorial plane CL. Additionally, all of the sipes 312* and 322* in the region on the inner side region side, demarcated by the tire equatorial plane CL were constituted by three-dimensional sipes and all of the sipes 332* and 322* in the region on the outer side region side were constituted by two-dimensional sipes.

The pneumatic tire of Conventional Example 3 included three circumferential main grooves and four land portions in the tread portion. Additionally, the sipes in each of the land portions were all two-dimensional sipes. Moreover, the rubber hardnesses $H1_{in}^*$ and $H2_{in}^*$ of the cap rubber of the land portions in the inner side region were greater than the rubber hardnesses $H1_{out}^*$ and $H2_{out}$ of the cap rubber of the land portions in the outer side region. Moreover, the sipe density $D_{in}^*$ of the inner side region was less than the sipe density $D_{out}^*$ of the outer side region.

As is clear from the test results, with the pneumatic tires 1B of Working Examples 12 to 20, compared with the pneumatic tire of the Conventional Example 3, the dry steering stability and the snow steering stability of the tires are enhanced (see FIG. 9). Additionally, in a comparison of Working Examples 12 and 13, it is clear that both the dry steering stability and the snow steering stability of the tire are achieved due to the difference in rubber hardness between the inner side region and the outer side region being made appropriate. Furthermore, in a comparison of Working Examples 12, 14, and 15, it is clear that both the dry steering stability and the snow steering stability of the tire are achieved due to the ratio $D_{in}^*/D_{out}^*$ of the sipe density $D_{in}^*$ of the inner side region to the sipe density $D_{out}^*$ of the outer side region being made appropriate, and the ratio $S_{in}^*/S_{out}^*$ of the groove area ratio $S_{in}^*$ in the inner side region to the groove area ratio $S_{out}^*$ in the outer side region, along with the total groove area ratio S_t being made appropriate. Additionally, in a comparison of Working Examples 12 and 16 to 18, it is clear that the high-speed durability performance of the tire is enhanced due to the relationship between the groove width W1* and the groove depth Hd1* of the lug grooves in the inner side region and the groove width W2* and the groove depth Hd2* of the lug grooves in the outer side region being made appropriate.

What is claimed is:

1. A pneumatic tire comprising a plurality of circumferential main grooves extending in a tire circumferential direction, and a plurality of land portions that are partitioned and formed by the circumferential main grooves in a tread portion, wherein, when a region corresponding to 35% of a tread pattern developed width from a first tread edge is an inner side region and a region corresponding to 35% of a tread pattern developed width from a second tread edge is an outer side region, the plurality of land portions each have a plurality of sipes, not less than 90% of the sipes disposed in the inner side region are constituted by three-dimensional sipes and not less than 90% of the sipes disposed in the outer side region are constituted by two-dimensional sipes, the tread portion comprises a cap rubber and an under rubber, and a rubber hardness $H1_{in}*$ at $-10°$ C. and a rubber hardness $H2_{in}*$ at $20°$ C. of the cap rubber in the inner side region, and a rubber hardness $H1_{out}*$ at $-10°$ C. and a rubber hardness $H2_{out}*$ at $20°$ C. of the cap rubber in the outer side region have relationships such that $H1_{in}*>H1_{out}*$ and $H2_{in}*>H2_{out}*$.

2. The pneumatic tire according to claim 1, wherein the rubber hardnesses $H1_{in}*$ and $H2_{in}*$ in the inner side region and the rubber hardnesses $H1_{out}*$ and $H2_{out}*$ in the outer side region satisfy the relationships: $68 \leq H1_{in}* \leq 78$; $65 \leq H2_{in}* \leq 75$; $65 \leq H1_{out}* \leq 75$; and $62 \leq H2_{out}* \leq 72$; along with $3 \leq H1_{in}*-H1_{out}* \leq 10$; and $3 \leq H2_{in}*-H2_{out}* \leq 10$.

3. The pneumatic tire according to claim 1, wherein a sipe density $D_{in}*$ of the inner side region and a sipe density $D_{out}*$ of the outer side region have a relationship such that $1.2 \leq D_{out}*/D_{in}* \leq 2.0$.

4. The pneumatic tire according to claim 1, wherein each of the inner side region and the outer side region comprises lug grooves that open to a tire ground contact edge, and a groove width $W1*$ of the lug grooves in the inner side region and a groove width $W2*$ of the lug grooves in the outer side region have a relationship such that $0.5 \text{ mm} \leq W2*-W1* \leq 2.0$ mm.

5. The pneumatic tire according to claim 1, wherein each of the inner side region and the outer side region comprises lug grooves that open to a tire ground contact edge, and a groove depth $Hd1*$ of the lug grooves in the inner side region and a groove depth $Hd2*$ of the lug grooves in the outer side region have a relationship such that $1.0 \text{ mm} \leq Hd2*-Hd1* \leq 3.0$ mm.

6. The pneumatic tire according to claim 1, comprising three of the circumferential main grooves and four of the land portions in a tread portion; wherein a ground contact width of the land portions on the ground contact edge of the inner side region is greater than a ground contact width of the land portions on the ground contact edge of the outer side region;

the land portions in the inner side region comprise a plurality of inclined grooves inclining with respect to the tire circumferential direction, a plurality of first lug grooves extending in a tire width direction from an outer side of the tire ground contact patch so as to communicate with the inclined grooves, and a plurality of second lug grooves extending in the tire width direction so as to connect the inclined grooves and the circumferential main grooves; and not less than three of the first lug grooves are in communication with one of the inclined grooves.

7. The pneumatic tire according to claim 1, wherein, when the left and right circumferential main grooves disposed outermost in the tire width direction are called outermost circumferential main grooves, a region on an inner side in the tire width direction of the tread portion, demarcated by groove center lines of the left and right outermost circumferential main grooves is a center region, and left and right regions on outer sides in the tire width direction are called shoulder regions, a single center land portion partitioned and formed by the left and right outermost circumferential main grooves is disposed in the center region, and the center land portion has a plurality of main inclined grooves and a plurality of minor inclined grooves arranged in the tire circumferential direction, the plurality of main inclined grooves each extend while inclining with respect to the tire circumferential direction in a form so as be oriented in a single direction in the tire circumferential direction and to become separated from a tire equatorial plane; a first end of each of the plurality of main inclined grooves communicates with the right or left outermost circumferential main groove; and the plurality of main inclined grooves are disposed alternately in the tire circumferential direction on both sides of the tire equatorial plane; and the plurality of minor inclined grooves each extend while inclining with respect to the tire circumferential direction in a form so as be oriented in a single direction in the tire circumferential direction and to become separated from a tire equatorial plane; each of the plurality of minor inclined grooves intersects two of the main inclined grooves and both ends thereof terminate within the center land portion; and the plurality of minor inclined grooves are disposed alternately in the tire circumferential direction on both sides of the tire equatorial plane.

8. The pneumatic tire according to claim 1, having an indicator designating a mounting direction on a vehicle wherein the inner side region is on an inner side in a vehicle width direction.

9. The pneumatic tire according to claim 8, having an indicator designating a mounting direction on a vehicle wherein a camber angle $\delta$ is in a range of $-4° \leq \delta \leq 0°$.

* * * * *